United States Patent
Li et al.

(10) Patent No.: US 12,430,365 B2
(45) Date of Patent: Sep. 30, 2025

(54) LAKEHOUSE METADATA TAG CREATION METHOD, LAKEHOUSE METADATA TAG QUERY METHOD AND ELECTRONIC DEVICE

(71) Applicant: Beijing Volcano Engine Technology Co., Ltd., Beijing (CN)

(72) Inventors: Mengjun Li, Beijing (CN); Jun Guo, Beijing (CN); Ke Sun, Beijing (CN); Qing Xu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/942,247

(22) Filed: Nov. 8, 2024

(65) Prior Publication Data
US 2025/0156445 A1 May 15, 2025

(30) Foreign Application Priority Data
Nov. 9, 2023 (CN) .......................... 202311490576.6

(51) Int. Cl.
*G06F 16/28* (2019.01)
*G06F 16/2455* (2019.01)

(52) U.S. Cl.
CPC ........ *G06F 16/283* (2019.01); *G06F 16/2455* (2019.01)

(58) Field of Classification Search
CPC ............................ G06F 16/283; G06F 16/2455
USPC ....................................................... 707/600
See application file for complete search history.

(56) References Cited

U.S. PATENT DOCUMENTS

| | | | | |
|---|---|---|---|---|
| 7,296,032 B1* | 11/2007 | Beddow | ................ | G06F 16/489 |
| 8,468,244 B2* | 6/2013 | Redlich | .................. | G06Q 50/18 |
| | | | | 715/255 |
| 9,430,115 B1* | 8/2016 | Yun | ........................ | G06F 16/739 |
| 9,519,699 B1* | 12/2016 | Kulkarni | ................ | G06F 16/951 |
| 9,645,897 B2* | 5/2017 | Diederich | ............. | G06F 3/0689 |
| 10,521,230 B2* | 12/2019 | DeHon | ................. | G06F 9/3867 |

(Continued)

FOREIGN PATENT DOCUMENTS

| | | |
|---|---|---|
| CN | 113282680 A | 8/2021 |
| CN | 114969094 A | 8/2022 |
| CN | 116401703 A | 7/2023 |

OTHER PUBLICATIONS

Uncle Zhang talks knowledge, "Common architecture and technology selection of portrait platform," Baidu, Available Online at https://baijiahao.baidu.com/s?id=1778782132504318967, Oct. 5, 2023, 11 pages.

(Continued)

*Primary Examiner* — Hanh B Thai
(74) *Attorney, Agent, or Firm* — Alleman Hall & Tuttle LLP

(57) ABSTRACT

A lakehouse metadata tag creation method, a lakehouse metadata tag query method and an electronic device are provided. The method includes: after a metadata service gateway determines a metadata tag creation request based on a metadata tag creation parameter provided by a data engine, sending, by the metadata service gateway, the metadata tag creation request to a metadata tag service system, so that the metadata tag service system executes a tag creation logic based on the metadata tag creation parameter carried in the metadata tag creation request, to implement a requirement of tagging one or more pieces of metadata.

20 Claims, 7 Drawing Sheets

(56) References Cited

U.S. PATENT DOCUMENTS

| | | | |
|---|---|---|---|
| 10,972,580 B1* | 4/2021 | Dorn | H04L 41/0246 |
| 11,991,247 B1* | 5/2024 | Waller | H04L 67/1097 |
| 12,093,263 B1* | 9/2024 | Feng | G06F 16/2423 |
| 12,114,986 B2* | 10/2024 | Grantcharov | A61B 5/02405 |
| 2004/0015514 A1* | 1/2004 | Melton | G06F 16/2228 |
| 2004/0177319 A1* | 9/2004 | Horn | G06F 16/10 |
| | | | 715/201 |
| 2006/0085465 A1* | 4/2006 | Nori | G06F 16/213 |
| 2010/0332475 A1* | 12/2010 | Birdwell | G06F 18/2323 |
| | | | 707/E17.014 |
| 2012/0159304 A1* | 6/2012 | Listou | G06F 16/2423 |
| | | | 715/227 |
| 2013/0129142 A1* | 5/2013 | Miranda-Steiner | G06F 16/587 |
| | | | 382/103 |
| 2015/0106468 A1* | 4/2015 | Kobayashi | G06F 3/0635 |
| | | | 709/212 |
| 2015/0363484 A1* | 12/2015 | Kamath | G06F 16/907 |
| | | | 707/751 |
| 2017/0063720 A1* | 3/2017 | Foskett | H04L 67/56 |
| 2017/0286502 A1* | 10/2017 | Bar-Or | G06F 8/34 |
| 2017/0286526 A1* | 10/2017 | Bar-Or | G06F 8/34 |
| 2019/0324987 A1* | 10/2019 | Kamath | G06F 16/907 |
| 2019/0384604 A1* | 12/2019 | Dehon | G06F 15/78 |
| 2020/0242079 A1* | 7/2020 | Dain | G06F 16/164 |
| 2020/0242159 A1* | 7/2020 | Dain | G06F 11/3034 |
| 2020/0272640 A1* | 8/2020 | Whitley | G06F 16/9024 |
| 2020/0401452 A1* | 12/2020 | Piercey | G06F 9/5016 |
| 2021/0099450 A1* | 4/2021 | Jain | H04L 63/0823 |
| 2021/0271686 A1* | 9/2021 | Abdul Rasheed | G06F 11/1451 |
| 2021/0365296 A1* | 11/2021 | Shilane | G06F 16/2455 |
| 2022/0327119 A1* | 10/2022 | Gasper | G06F 16/9024 |
| 2022/0350595 A1* | 11/2022 | Liu | G06F 9/451 |
| 2023/0205158 A1* | 6/2023 | Ramanasankaran | |
| | | | G06F 16/9024 |
| | | | 700/28 |
| 2023/0237068 A1* | 7/2023 | Sillifant | G06F 16/211 |
| | | | 707/626 |
| 2023/0359614 A1* | 11/2023 | Oattes | G06F 16/221 |
| 2024/0143610 A1* | 5/2024 | Brenner | G06F 16/2462 |
| 2024/0143811 A1* | 5/2024 | Brenner | G06F 21/6218 |
| 2024/0143815 A1* | 5/2024 | Brenner | G06F 16/1873 |
| 2024/0311506 A1* | 9/2024 | Malkin | G06F 21/6245 |
| 2024/0320240 A1* | 9/2024 | Podder | G06F 21/6245 |
| 2025/0110676 A1* | 4/2025 | Frieder | G06F 16/5866 |

OTHER PUBLICATIONS

Beijing Maicong Software Co., Ltd, "Data middle platform selection must-read: How to build a metadata management center in a data middle platform," Baidu, Available Online at https://baijiahao.baidu.com/s?id=1748468871001504265&wfr=spider&for=pc, Nov. 3, 2022, 11 pages.

Javaedge, "To build an efficient data middle platform, the meta-data center is the key!," 51CTO, Available Online at https://blog.51cto.com/JavaEdge/6781381, Jul. 19, 2023, 14 pages.

* cited by examiner

LAKEHOUSE METADATA TAG CREATION METHOD, LAKEHOUSE METADATA TAG QUERY METHOD AND ELECTRONIC DEVICE

CROSS-REFERENCE TO RELATED APPLICATION

The present disclosure claims priority of the Chinese Patent Application No. 202311490576.6 filed with the Chinese Patent Office on Nov. 9, 2023, the entire disclosure of which is incorporated by reference in the present disclosure.

TECHNICAL FIELD

The present application relates to the field of data processing technologies, and in particular, to a lakehouse metadata tag creation method, a lakehouse metadata tag query method, a system, an apparatus, a device, and a medium.

BACKGROUND

For some big data application scenarios, these scenarios may have the following requirements: tagging lakehouse metadata (for example, a user has an access permission for a certain piece of metadata, or the like), so that the tag can describe features of the metadata.

However, how to meet the foregoing requirements is a technical problem to be urgently solved

SUMMARY

To solve the above technical problems, the present disclosure provides a lakehouse metadata tag creation method, a lakehouse metadata tag query method, a system, an apparatus, a device, and a medium.

To achieve the above objective, the technical solutions provided by the present disclosure are as follows.

The present disclosure provides a lakehouse metadata tag creation method, applied to a metadata tag service system, the method including:
receiving a metadata tag creation request sent by a metadata service gateway, wherein the metadata tag creation request is determined by the metadata service gateway based on a metadata tag creation parameter provided by a data engine, and the metadata tag creation parameter includes a first tag name, a first tag value, and first tag effect object description information; and
executing a tag creation logic based on the metadata tag creation parameter carried in the metadata tag creation request.

In a possible implementation, the tag creation logic includes:
writing tag name record content corresponding to the first tag name into a tag name record table, wherein the tag name record content includes a tag name identifier corresponding to the first tag name;
writing tag effect object record content corresponding to the first tag effect object description information into a tag effect object record table, wherein the tag effect object record content includes a tag effect object identifier corresponding to the first tag effect object description information; and
writing tag value record content corresponding to the first tag value into a tag value record table, wherein the tag value record content is determined based on the first tag value, the tag name identifier, and the tag effect object identifier.

In a possible implementation, the metadata tag creation parameter further includes a first tag set name; and
before the writing tag name record content corresponding to the first tag name into a tag name record table, the tag creation logic further includes:
writing tag set record content corresponding to the first tag set name into a tag set record table, wherein the tag set record content includes a set identifier corresponding to the first tag set name; and
determining the tag name record content corresponding to the first tag name based on the set identifier and the first tag name.

In a possible implementation, the writing tag effect object record content corresponding to the first tag effect object description information into a tag effect object record table includes:
if there is no tag effect object record content corresponding to the first tag effect object description information in the tag effect object record table, writing the tag effect object record content corresponding to the first tag effect object description information into the tag effect object record table.

In a possible implementation, the method further includes:
if it is detected that the tag creation logic is executed, generating feedback information corresponding to the metadata tag creation request; and
sending the feedback information to the metadata service gateway, wherein the metadata service gateway is configured to forward the feedback information to the data engine.

In a possible implementation, the metadata tag creation parameter includes a first tag set name, a first tag name, a first tag value, and first tag effect object description information; and
the generating feedback information corresponding to the metadata tag creation request includes:
combining the first tag value, a set identifier corresponding to the first tag set name, a tag name identifier corresponding to the first tag name, and a tag effect object identifier corresponding to the first tag effect object description information to obtain the feedback information.

In a possible implementation, the metadata tag creation request is a request for creating a tag corresponding to one piece of metadata or a plurality of pieces of metadata;
the one piece of metadata or the plurality of pieces of metadata are managed by a metadata storage system; and
the metadata service gateway is configured to route a metadata processing request sent by the data engine to the metadata storage system, and the metadata storage system is configured to execute data processing logic corresponding to the metadata processing request.

The present disclosure provides a lakehouse metadata tag query method, applied to a metadata tag service system, wherein the metadata tag service system is configured to query a tag created by using the lakehouse metadata tag creation method provided in the present disclosure; and
the query method includes:
receiving a metadata tag query request sent by a metadata service gateway, wherein the metadata tag query request is determined by the metadata service gateway based on a metadata tag query parameter provided by a data engine;

performing tag query processing based on the metadata tag query parameter carried in the metadata tag query request, to obtain a tag query result corresponding to the metadata tag query request; and sending the tag query result to the metadata service gateway, wherein the metadata service gateway is configured to feed back the tag query result to the data engine.

In a possible implementation, the metadata tag query parameter includes a second tag name and second tag effect object description information; and a process of determining the tag query result includes:

searching for a tag name identifier corresponding to the second tag name in a tag name record table;

searching for a tag effect object identifier corresponding to the second tag effect object description information in a tag effect object record table;

querying a tag value record table based on the tag name identifier and the tag effect object identifier, to obtain a second tag value; and determining the tag query result based on the second tag value.

In a possible implementation, the metadata tag creation parameter further includes a second tag set name; and before the searching for a tag name identifier corresponding to the second tag name in a tag name record table, the process of determining the tag query result further includes:

searching for a set identifier corresponding to the second tag set name in a tag set record table; and the searching for a tag name identifier corresponding to the second tag name in a tag name record table includes:

querying the tag name record table based on the set identifier and the second tag name, to obtain the tag name identifier corresponding to the second tag name.

In a possible implementation, the determining the tag query result based on the second tag value includes:

combining the set identifier, the tag name identifier, the tag effect object identifier, and the second tag value to obtain the tag query result.

The present disclosure provides a lakehouse metadata management system, including a metadata service gateway, at least one metadata storage system, and a metadata tag service system, wherein the metadata service gateway is configured to route a request sent by a data analysis engine to the metadata tag service system or any one of the at least one metadata storage system;

the metadata storage system is configured to manage at least one piece of metadata based on the request; and the metadata tag service system is configured to manage a tag corresponding to part of or all of the at least one piece of metadata based on the request.

In a possible implementation, the metadata tag service system is configured to execute the lakehouse metadata tag creation method provided in the present disclosure, or execute the lakehouse metadata tag query method provided in the present disclosure.

The present disclosure provides a lakehouse metadata tag creation apparatus, including:

a first receiving unit, configured to receive a metadata tag creation request sent by a metadata service gateway, wherein the metadata tag creation request is determined by the metadata service gateway based on a metadata tag creation parameter provided by a data engine, and the metadata tag creation parameter includes a first tag name, a first tag value, and first tag effect object description information; and a tag creation unit, configured to execute a tag creation logic based on the metadata tag creation parameter carried in the metadata tag creation request.

The present disclosure provides a lakehouse metadata tag query apparatus, wherein the lakehouse metadata tag query apparatus is configured to query a tag created by using the lakehouse metadata tag creation method provided in the present disclosure; and the apparatus includes:

a second receiving unit, configured to receive a metadata tag query request sent by a metadata service gateway, wherein the metadata tag query request is determined by the metadata service gateway based on a metadata tag query parameter provided by a data engine;

a tag query unit, configured to perform tag query processing based on the metadata tag query parameter carried in the metadata tag query request, to obtain a tag query result corresponding to the metadata tag query request; and a query feedback unit, configured to send the tag query result to the metadata service gateway, wherein the metadata service gateway is configured to feed back the tag query result to the data engine.

The present disclosure provides an electronic device, wherein the device includes: a processor and a memory;

the memory is configured to store an instruction or a computer program; and the processor is configured to execute the instruction or the computer program in the memory, so that the electronic device executes the lakehouse metadata tag creation method or the lakehouse metadata tag query method provided in the present disclosure.

The present disclosure provides a computer-readable medium, wherein the computer-readable medium stores an instruction or a computer program, and when the instruction or the computer program runs on a device, the device is enabled to execute the lakehouse metadata tag creation method or the lakehouse metadata tag query method provided in the present disclosure.

The present disclosure provides a computer program product, which includes a computer program carried on a non-transitory computer-readable medium, and the computer program includes program code for executing the lakehouse metadata tag creation method or the lakehouse metadata tag query method provided in the present disclosure.

Compared with the related art, the present disclosure has at least the following advantages.

In the technical solution provided in the present disclosure, after a metadata service gateway determines a metadata tag creation request based on a metadata tag creation parameter (for example, parameters such as a tag set name, a tag name, a tag effect object, and a tag value) provided by a data engine (for example, an engine such as Spark), the metadata service gateway sends the metadata tag creation request to a metadata tag service system, so that the metadata tag service system can execute a tag creation logic based on the metadata tag creation parameter carried in the metadata tag creation request, to implement a metadata tag creation requirement described by the metadata tag creation request, so that a requirement of tagging one or more pieces of metadata can be implemented, thereby implementing finer-grained tagging processing. In this way, defects caused by implementing the tagging processing by adding a new parameter to attribute information (properties) of a metadata database, a metadata table, or a metadata partition can be effectively avoided, thereby effectively improving the tagging effect.

BRIEF DESCRIPTION OF DRAWINGS

To make the objectives, technical solutions, and advantages of the embodiments of the present disclosure clearer, the accompanying drawings used in the description of the embodiments or related art are briefly described below. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
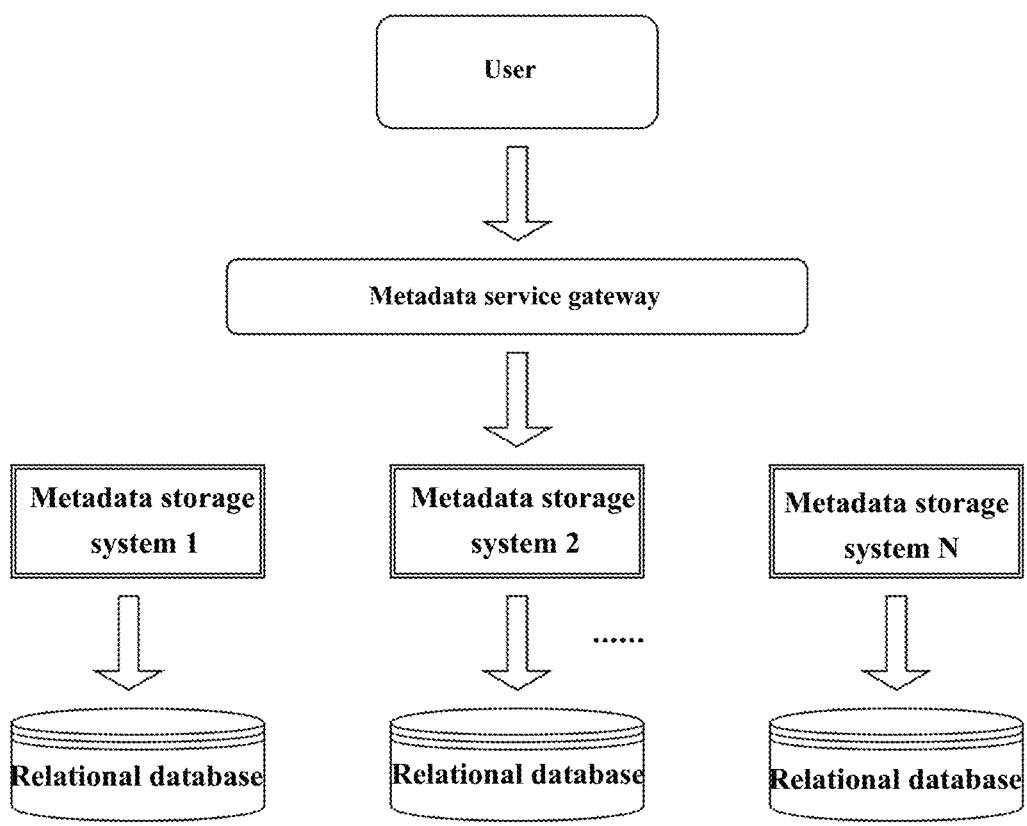
FIG. 1 is a schematic diagram of a metadata service architecture according to an embodiment of the present disclosure.

It is found through research that in some application scenarios (for example, a scenario in which the architecture shown in FIG. 1 is used), to meet the foregoing tagging requirement, tag information may be recorded by adding a new parameter to properties of a metadata database, a metadata table, or a metadata partition. However, this tagging method has the following defects: Firstly, the permission of these tags is the same as the permission of the metadata. A user with the metadata permission can operate the tags, and it is difficult to achieve service isolation, and indicators may affect each other. Secondly, this tagging method is only applicable to coarse-grained tagging such as database, table, and partition tagging, and cannot meet the requirement of row or column tagging, resulting in limited tagging granularity. Moreover, for a unified metadata service that supports multiple data sources, tagging cannot be performed for a specific data type. Finally, a large amount of tag data may easily impose a high pressure on the stability and performance of the metadata storage system, affecting all users.

Based on the foregoing finding, to better improve the tagging effect, the present disclosure provides a lakehouse metadata tag creation method. The method includes: after a metadata service gateway determines a metadata tag creation request based on a metadata tag creation parameter (for example, parameters such as a tag set name, a tag name, a tag effect object, and a tag value) provided by a data engine (for example, an engine such as Spark), sending, by the metadata service gateway, the metadata tag creation request to a metadata tag service system, so that the metadata tag service system can execute a tag creation logic based on the metadata tag creation parameter carried in the metadata tag creation request, to implement a metadata tag creation requirement described by the metadata tag creation request, so that a requirement of tagging one or more pieces of metadata can be implemented, thereby implementing finer-grained tagging processing. In this way, defects caused by implementing the tagging processing by adding a new parameter to attribute information (properties) of a metadata database, a metadata table, or a metadata partition can be effectively avoided, thereby effectively improving the tagging effect.

To make persons skilled in the art better understand the solutions of the present disclosure, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 2:
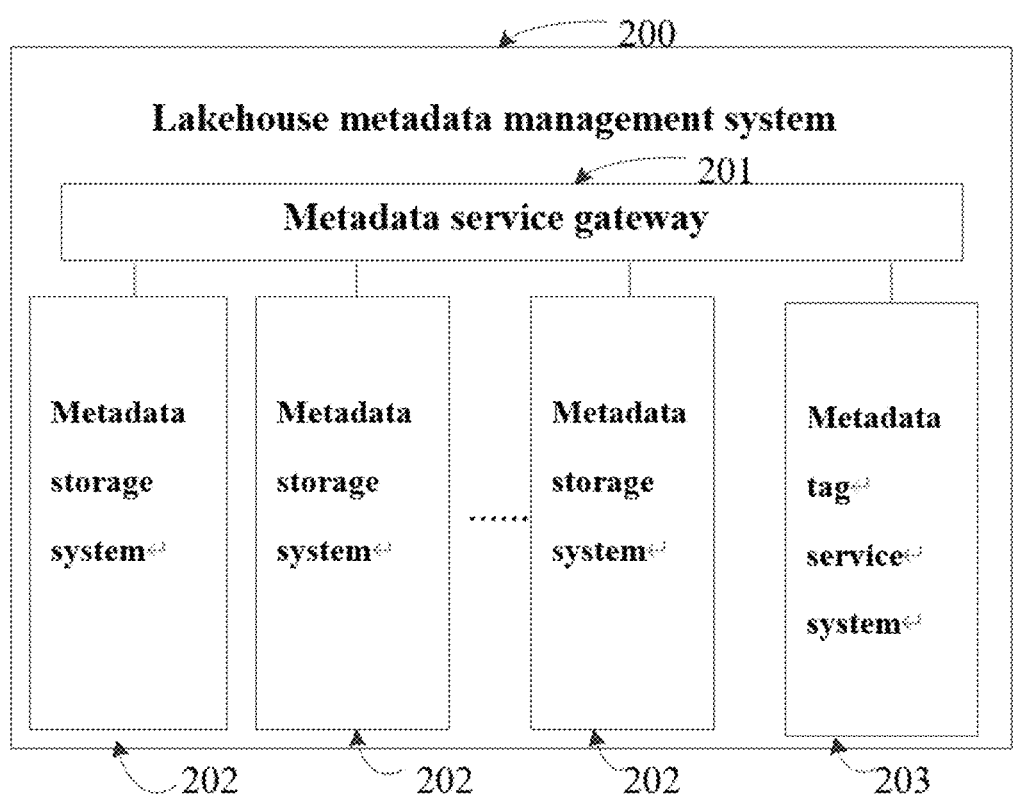
FIG. 2 is a schematic diagram of a structure of a lakehouse metadata management system according to an embodiment of the present disclosure.

To better understand the technical solutions provided in the present disclosure, in the following, a lakehouse metadata management system provided in the present disclosure is described firstly with reference to some accompanying drawings. As shown in FIG. 2, a lakehouse metadata management system 200 provided in an embodiment of the present disclosure may include a metadata service gateway 201, at least one metadata storage system 202, and a metadata tag service system 203. The metadata service gateway is configured to route a request sent by a data analysis engine to the metadata tag service system 203 or any one of the at least one metadata storage system 202. The metadata storage system 202 is configured to manage at least one piece of metadata based on the request. The metadata tag service system 203 is configured to manage a tag corresponding to part of or all of the at least one piece of metadata based on the request. For ease of understanding, the data analysis engine, the metadata service gateway 201, the metadata storage system 202, and the metadata tag service system 203 are described below in sequence.

The data engine refers to an engine that can implement some processing processes (for example, a metadata processing process, a metadata tagging process, or the like) with the help of the lakehouse metadata management system 200, so that the data engine is configured to represent an upper-layer service (for example, a client or the like) of the lakehouse metadata management system 200, so that the data engine can use the lakehouse metadata management system 200 to implement some processing processes in some manner (for example, by means of interface calling or the like).

In addition, the implementation of the data engine is not limited in the present disclosure. For example, the data engine may be implemented by using any existing or future engine (for example, any data analysis engine, any data query engine, or any data computing engine) that can access the lakehouse metadata management system 200. It can be seen that in a possible implementation, when the metadata storage system 202 in the lakehouse metadata management system 200 is implemented by using Hive Metastore, the data engine may be implemented by using a HiveServer2 engine, so that the data engine can access the metadata service gateway 201 by means of interface calling, so that the metadata service gateway 201 can route a request provided by the data engine to the metadata tag service system 203 or any one of the at least one metadata storage system 202 in the lakehouse metadata management system 200, and the metadata tag service system 203 or the metadata storage system 202 processes the request, to implement some metadata-related processes.

It should be noted that the implementation of the Hive-Server2 engine in the foregoing paragraph is not limited in the present disclosure. For example, the HiveServer2 engine may include one or more of at least one structured query language (SQL) engine, at least one batch-stream processing engine, and at least one intelligent analysis platform engine.

It should also be noted that the implementation of the SQL engine in the foregoing paragraph is not limited in the present disclosure. For example, the SQL engine may be implemented by using any existing or future SQL engine (for example, an SQL engine such as Hive or Presto). In addition, the implementation of the batch-stream processing engine in the foregoing paragraph is not limited in the present disclosure. For example, the batch-stream processing engine may be implemented by using any existing or future batch-stream processing engine (for example, a batch-stream processing engine such as Spark or Flink). In addition, the implementation of the intelligent analysis platform engine in the foregoing paragraph is not limited in the present disclosure. For example, the intelligent analysis platform engine may be implemented by using any existing or future intelligent analysis platform engine, for example, a business intelligence (BI) analysis platform engine.

In addition, the implementation of the request sent by the data engine is not limited in the present disclosure. For example, in some application scenarios (for example, scenarios such as adding, deleting, and modifying metadata), the request sent by the data engine may be a metadata processing request. The metadata processing request is a request for performing some processing (for example, adding, deleting, and modifying) on one piece of metadata or a plurality of pieces of metadata. Moreover, the implementation of the metadata processing request is not limited in the present disclosure. For another example, in some application scenarios (for example, scenarios such as tagging some metadata), the request sent by the data engine may be a metadata tagging request. The metadata tagging request is a request for tagging one piece of metadata or a plurality of pieces of metadata. Moreover, the implementation of the metadata tagging request is not limited in the present disclosure.

In addition, data communication may be performed between the data engine and the metadata service gateway 201 in the lakehouse metadata management system 200. Moreover, the communication manner of the data communication is not limited in the present disclosure. For example, the data communication may be implemented by using any existing or future manner that can implement data communication between the data engine and the metadata service gateway 201. For another example, in some application scenarios, the data engine may access the metadata service gateway 201 by means of interface calling, so that the metadata service gateway 201 can route a request provided by the data engine through the interface to the metadata tag service system 203 or any one of the at least one metadata storage system 202 in the lakehouse metadata management system 200, and the metadata tag service system 203 or the metadata storage system 202 processes the request.

It can be learned from the foregoing related content of the data engine that the data engine may be configured to represent a client of the lakehouse metadata management system 200, so that the data engine can provide some metadata-related services (for example, a metadata deletion service, a metadata tagging service, or the like) to a user by using the lakehouse metadata management system 200. Moreover, a exemplary implementation process of these metadata-related services may be as follows: First, the data engine may generate a certain request (for example, the foregoing metadata processing request or metadata tagging request) based on a user operation. Then, the data engine sends the request to the metadata service gateway 201 in the lakehouse metadata management system 200 by using a software development kit (SDK) that has been deployed in the data engine, so that the metadata service gateway 201 can route the request to the metadata tag service system 203 or any one of the at least one metadata storage system 202 in the lakehouse metadata management system 200, so that the metadata tag service system 203 or the metadata storage system 202 processes the request. In this way, a metadata service requirement (for example, a requirement of deleting a certain piece of metadata or tagging a certain piece of metadata) described by the user operation can be implemented.

Figure 3:
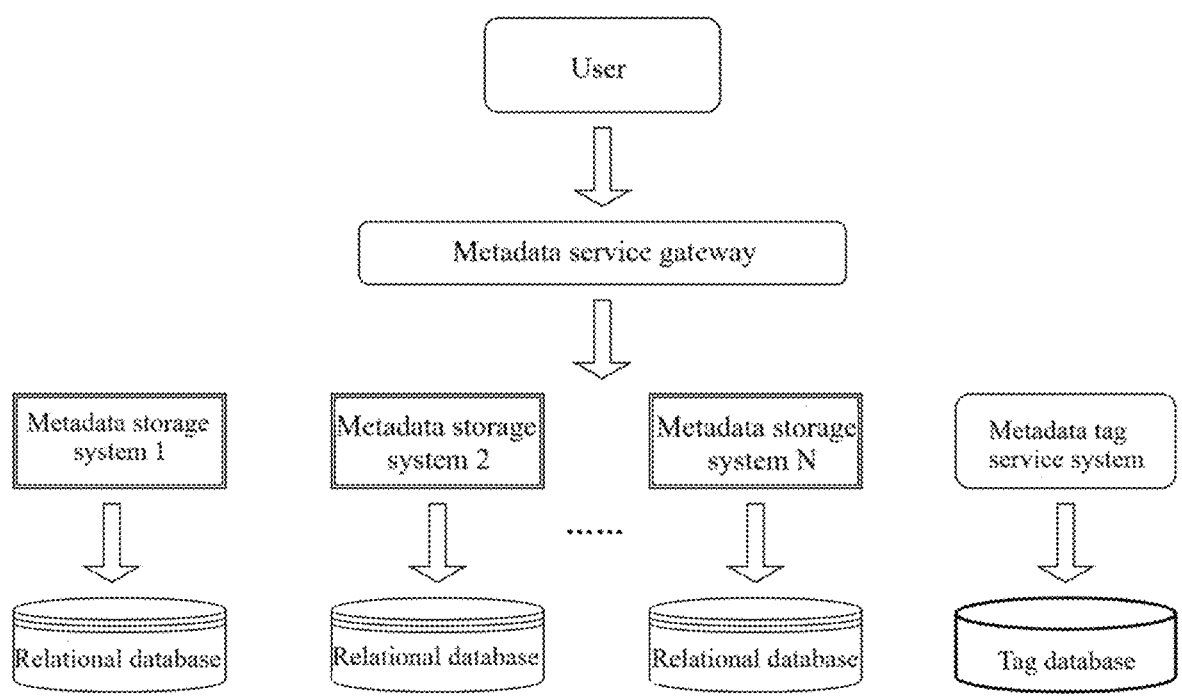
FIG. 3 is a schematic diagram of another metadata service architecture according to an embodiment of the present disclosure.

For the metadata service gateway 201 (for example, the metadata service gateway shown in FIG. 3), the metadata service gateway 201 may be configured to route a request sent by the data analysis engine to the metadata tag service system 203 or any one of the at least one metadata storage system 202, so that the metadata tag service system 203 or the metadata storage system 202 processes the request. For ease of understanding, in the following, the description is given with reference to two scenarios.

Scenario 1: In some application scenarios (for example, scenarios such as adding, deleting, and modifying metadata), when the data analysis engine is configured to generate a metadata processing request based on a user operation, and the metadata processing request is a request for performing data processing (for example, metadata deletion processing, metadata modification processing, metadata addition processing, or the like) on one piece of metadata or a plurality of pieces of metadata, a working principle of the metadata service gateway 201 may be as follows: After the metadata service gateway 201 receives the metadata processing request sent by the data analysis engine, the metadata service gateway 201 may first determine, from the at least one metadata storage system 202 based on a pre-established routing relationship, one metadata storage system 202 that is configured to process the metadata processing request, as a target system. Then, the metadata service gateway 201 sends the metadata processing request to the target system, so that the target system processes the metadata processing request subsequently. The routing relationship is preset for the metadata service gateway 201, so that the routing relationship can guide the metadata service gateway 201 to select which downstream system (for example, the metadata tag service system 203 or a certain metadata storage system 202) to be used to process a metadata-related request received by the metadata service gateway 201. The target system is configured to represent a metadata storage system which is selected by the metadata service gateway 201 and configured to process the metadata processing request.

It can be learned from the foregoing content that in some application scenarios, the metadata service gateway 201 may be configured to route the metadata processing request sent by the data analysis engine to the target system in the at least one metadata storage system 202, so that the target system processes the request.

Scenario 2: In some application scenarios (for example, scenarios such as tagging metadata), when the data analysis engine is configured to generate a metadata tagging request based on a user operation, and the metadata tagging request is a request for tagging one piece of metadata or a plurality of pieces of metadata, a working principle of the metadata service gateway 201 may be as follows: After the metadata service gateway 201 receives the metadata tagging request sent by the data analysis engine, the metadata service gateway 201 may send the metadata tagging request to the metadata tag service system 203 based on a pre-established routing relationship, so that the metadata tag service system 203 processes the metadata tagging request subsequently.

It can be learned from the foregoing content that in some application scenarios, the metadata service gateway 201 may be configured to route the metadata tagging request sent by the data analysis engine to the metadata tag service system 203, so that the metadata tag service system 203 processes the request.

In addition, the implementation of the metadata service gateway 201 is not limited in the present disclosure. For example, the metadata service gateway 201 may be implemented by using any existing or future metadata service gateway. For another example, in some application scenarios, when each of the metadata storage systems 202 in the lakehouse metadata management system 200 is implemented by using Hive Metastore, to better improve the compatibility, the metadata service gateway 201 may also be implemented by using Hive Metastore, so that the metadata service gateway 201 can be fully compatible with an interface of the Hive Metastore.

It can be learned from the foregoing related content of the metadata service gateway 201 that for the metadata service gateway 201 in the lakehouse metadata management system 200, the metadata service gateway 201 is mainly configured to forward information sent by some upstream services (for example, the at least one data engine) to a corresponding processing system (for example, the metadata tag service system 203 or a certain metadata storage system 202), which is beneficial to improving the metadata processing effect.

For the metadata storage system 202, the metadata storage system 202 is configured to manage at least one piece of metadata (for example, delete metadata, add metadata, modify metadata, or the like), for example, the metadata storage system 202 may be configured to manage the at least one piece of metadata based on a request (for example, a data processing request or the like) sent by the metadata service gateway 201. It can be seen that in a possible implementation, the metadata storage system 202 may be configured to perform corresponding processing (for example, metadata deletion processing, metadata addition processing, metadata modification processing, or the like) on the metadata processing request sent by the metadata service gateway 201, to achieve the purpose of managing one piece of metadata or a plurality of pieces of metadata, which is beneficial to improving the metadata management effect.

In addition, the implementation of the metadata storage system 202 is not limited in the present disclosure. For example, the metadata storage system 202 may be implemented by using any existing or future system (for example, Hive Metastore or the like) that can manage metadata.

It can be learned from the foregoing metadata storage system 202 that for any one of the metadata storage systems 202 in the lakehouse metadata management system 200, the metadata storage system 202 may be mainly configured to manage lakehouse metadata (for example, add new metadata, delete existing metadata, modify existing metadata, or the like), so that the metadata storage system 202 can implement related management on metadata by processing a request sent by the metadata service gateway 201 in the lakehouse metadata management system 200, which is beneficial to improving the metadata management effect.

For the metadata tag service system 203, the metadata tag service system 203 is configured to manage a tag corresponding to part of or all of the at least one piece of metadata, for example, the metadata tag service system 203 may be configured to manage the tag corresponding to part of or all of the at least one piece of metadata based on a request (for example, a metadata tagging request or the like) sent by the metadata service gateway 201. It can be seen that in a possible implementation, the metadata tag service system 203 may be configured to perform corresponding processing (for example, metadata tagging processing or the like) on the metadata tagging request sent by the metadata service gateway 201, to achieve the purpose of managing a related tag of one piece of metadata or a plurality of pieces of metadata, which is beneficial to improving the metadata tag management effect.

In addition, the implementation of the metadata tag service system 203 is not limited in the present disclosure. For example, when each of the metadata storage systems 202 in the lakehouse metadata management system 200 is implemented by using Hive Metastore, and the metadata service gateway 201 in the lakehouse metadata management system 200 is also implemented by using Hive Metastore, to better reduce the deployment difficulty, the metadata tag service system 203 may be implemented by using Hive Metastore, which is beneficial to reducing a cost of deploying the metadata tag service system 203 in the lakehouse metadata management system 200, thereby facilitating implementing access to a tag service at a low cost without affecting the service stability of each of the metadata storage systems 202 in the lakehouse metadata management system 200.

In addition, the working principle of the metadata tag service system 203 is not limited in the present disclosure. For example, to better improve the tag management effect, the metadata tag service system 203 may implement the tagging processing by using any implementation of the lakehouse metadata tag creation method provided in the embodiment of the present disclosure, and implement the tag query processing by using any implementation of the lakehouse metadata tag query method provided in the embodiment of the present disclosure. It can be seen that in a possible implementation, the metadata tag service system 203 may be configured to execute any implementation of the lakehouse metadata tag creation method provided in this embodiment of the present disclosure, or execute any implementation of the lakehouse metadata tag query method provided in this embodiment of the present disclosure. It should be noted that for related content of the lakehouse metadata tag creation method, reference can be made to the following. For related content of the lakehouse metadata tag query method, reference can be made to the following.

It can be learned from the foregoing related content of the metadata tag service system 203 that for the metadata tag service system 203 in the lakehouse metadata management system 200, the metadata tag service system 203 may be mainly configured to manage a tag of lakehouse metadata (for example, perform tagging, query a tag, or the like), so that the metadata tag service system 203 can implement related tag management on metadata by processing a request sent by the metadata service gateway 201 in the lakehouse metadata management system 200, which is beneficial to improving the metadata tag management effect.

It can be learned from the foregoing related content of the lakehouse metadata management system 200 that the lakehouse metadata management system 200 may implement the metadata tag management by using a metadata tag service system 203 that can be completely independent of all the metadata storage systems 202, so that there is no mutual influence between related processing operations on the metadata tag and related processing operations on the metadata itself, which is beneficial to implementing access to a metadata tag service at a low cost without affecting the service stability of the metadata storage system 202, thereby effectively avoiding defects caused by implementing the tagging processing by adding a new parameter to attribute information (properties) of a metadata database, a metadata table, or a metadata partition, and further effectively improving the tagging effect.

Figure 4:
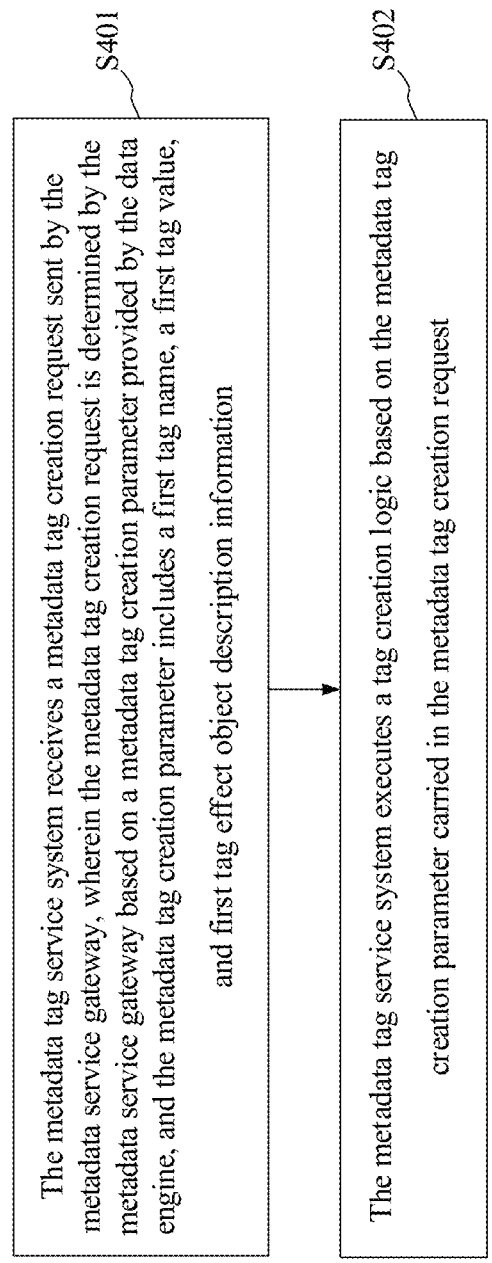
FIG. 4 is a flowchart of a lakehouse metadata tag creation method according to an embodiment of the present disclosure.

In addition, to better understand the technical solutions provided in the present disclosure, in the following, the lakehouse metadata tag creation method provided in the present disclosure is described firstly with reference to some accompanying drawings. As shown in FIG. 4, the lakehouse metadata tag creation method provided in an embodiment of the present disclosure includes the following S401 and S402. FIG. 4 is a flowchart of a lakehouse metadata tag creation method according to an embodiment of the present disclosure.

S401: A metadata tag service system receives a metadata tag creation request sent by a metadata service gateway, wherein the metadata tag creation request is determined by the metadata service gateway based on a metadata tag creation parameter provided by a data engine, and the metadata tag creation parameter includes a first tag name, a first tag value, and first tag effect object description information.

The metadata tag creation request refers to a request sent by the metadata service gateway and used to request to perform tagging processing on one piece of metadata or a plurality of pieces of metadata.

It can be learned from the foregoing content that in a possible implementation, the metadata tag creation request may be a request for creating a tag corresponding to one piece of metadata or a plurality of pieces of metadata. The one piece of metadata or the plurality of pieces of metadata are managed by the metadata storage system described above. The metadata service gateway is configured to route a metadata processing request sent by the data engine to the metadata storage system, so that the metadata storage system is configured to execute data processing logic corresponding to the metadata processing request. The data processing logic refers to logic that needs to be executed when the data storage system processes the metadata processing request. Moreover, the data processing logic is not limited in the present disclosure. For example, the data processing logic may refer to processing logic that is pre-configured for the data storage system and is used to respond to the metadata processing request.

In addition, for the metadata tag creation request, the metadata tag creation request is determined by the metadata service gateway based on a metadata tag creation parameter provided by the data engine described above, so that the metadata tag creation request carries the metadata tag creation parameter, and the metadata tag creation request can indicate a tag to be created for which piece of metadata. The metadata tag creation parameter refers to a parameter (for example, a tag set name, a tag name, a tag value, a tag effect object, or the like) that is provided by the data engine and is required for tagging one piece of metadata or a plurality of pieces of metadata, so that the metadata tag creation parameter is used to indicate elements (for example, three elements: a tag name, a tag value, and a tag effect object, or four elements: a tag set name, a tag name, a tag value, and a tag effect object) required for tag creation.

In addition, the implementation of the metadata tag creation parameter in the foregoing paragraph is not limited in the present disclosure. For ease of understanding, in the following, description is given with reference to two cases.

Case 1: In some application scenarios (for example, a scenario with a small quantity of tags), for a tag of metadata, if three elements that constitute the tag include a tag name, a tag value, and an object on which the tag acts, the related tag of the metadata may be directly stored based on the three elements, and does not need to be stored by constructing a tag set (for example, a database or the like).

It can be learned from the foregoing related content of Case 1 that in a possible implementation, the metadata tag creation parameter may include a first tag name, a first tag value, and first tag effect object description information. The first tag effect object description information refers to information that is required for describing a tag effect object and is required for use in tagging one piece of metadata or a plurality of pieces of metadata. Moreover, the first tag effect object description information may be used to describe a first tag effect object. The first tag effect object refers to an object that needs to be tagged (that is, an object described by the first tag effect object description information). Moreover, the first tag effect object is not limited in the present disclosure. For example, the first tag effect object may include one piece of metadata or a plurality of pieces of metadata. The first tag name refers to a tag name that is required for use in tagging the first tag effect object. The first tag value refers to a tag value that needs to be configured for the first tag name in tagging the first tag effect object.

In addition, the implementation of the first tag effect object description information in the foregoing paragraph is not limited in the present disclosure. For example, in some application scenarios, the first tag effect object description information may include one or more of a data source name (namespace), a database name (db_name), a data table name (tbl_name), a data column name (col_name), a data row expression (row_expression), and a partition name (part_name). The data source name is used to identify a data source to which the first tag effect object belongs. Moreover, the implementation of the data source name is not limited in the present disclosure. For example, the data source name may be hive, clickhouse, or the like. The database name is used to indicate a database where the first tag effect object is located. The data table name is used to indicate a data table where the first tag effect object is located. The data column name is used to indicate columns in the data table where the first tag effect object is located. The data row expression is used to indicate rows in the data table where the first tag effect object is located. Moreover, the data row expression is not limited in the present disclosure. For example, the data row expression may be implemented by using an expression similar to "score=90". The partition name is used to indicate a partition where the first tag effect object is located. Moreover, the partition name is not limited in the present disclosure. For example, the partition name may be implemented by using a string similar to "date='20230612'".

Case 2: In some application scenarios (for example, a scenario with a large quantity of tags), a related tag of metadata may need to be stored by constructing a tag set (for example, a database or the like), which is beneficial to improving the tag storage effect and subsequent tag query efficiency.

It can be learned from the foregoing related content of Case 2 that in a possible implementation, the metadata tag creation parameter may include a first tag set name, a first tag name, a first tag value, and first tag effect object description information. The first tag set name refers to a name of a first tag set, so that the first tag set name can indicate to which set a tag constituted by the first tag name, the first tag value, and the first tag effect object description information belongs. The first tag set refers to a set described by the first tag set name. Moreover, the first tag set is configured to record one or more pieces of tag data.

In addition, the implementation of the data engine providing the metadata tag creation parameter is not limited in the present disclosure. For ease of understanding, in the following, description is given with reference to examples.

Example 1: In some application scenarios, the data engine may provide the data tag creation parameter to the metadata service gateway by means of sending a request. It can be learned from this that in a possible implementation, the data engine may be configured to send a metadata tagging request to the metadata service gateway, and the metadata tagging request carries the data tag creation parameter, so that the metadata service gateway can extract the data tag creation parameter from the metadata tagging request. The metadata tagging request is a request for tagging one piece of metadata or a plurality of pieces of metadata. Moreover, the implementation of the metadata tagging request is not limited in the present disclosure.

Example 2: In some application scenarios, the data engine may directly provide the data tag creation parameter to the metadata service gateway by means of a certain communication protocol (for example, a Thrift protocol). It can be learned from this that in a possible implementation, the data engine may be configured to directly deliver the data tag creation parameter to the metadata service gateway as a communication message (for example, a Thrift message) by using an SDK that has been deployed in the data engine.

It can be learned from the foregoing related content of S401 that in some application scenarios, when at least one data engine has accessed the metadata service gateway in the lakehouse metadata management system, if a certain data engine sends a metadata tagging request to the metadata service gateway, the metadata service gateway may determine a metadata tag creation request based on the metadata tagging request (for example, directly determining the metadata tagging request as the metadata tag creation request), and send the metadata tag creation request to the metadata tag service system, so that the metadata tag service system subsequently implements the tag creation processing based on the metadata tag creation parameter carried in the metadata tag creation request.

S402: The metadata tag service system executes a tag creation logic based on the metadata tag creation parameter carried in the metadata tag creation request.

The tag creation logic refers to logic that is pre-configured for the metadata tag service system and is used to implement tag creation processing based on the metadata tag creation parameter.

In addition, the tag creation logic is not limited in the present disclosure. For ease of understanding, in the following, description is given with reference to two cases.

Case 1: In some application scenarios (for example, a scenario with a small quantity of tags), when the metadata tag creation parameter carried in the metadata tag creation request includes a first tag name, a first tag value, and first tag effect object description information, the tag creation logic may include the following Step 11 to Step 13, for example.

Step 11: The metadata tag service system writes, in a tag name record table, tag name record content corresponding to the first tag name, where the tag name record content includes a tag name identifier corresponding to the first tag name.

The tag name record table is configured to record related content of a tag name involved in a related tag of some metadata.

In addition, the implementation of the tag name record table is not limited in the present disclosure. For example, each record in the tag name record table may be implemented by using a binary tuple of (a tag name, a tag name identifier corresponding to the tag name). The tag name identifier is used to uniquely identify the tag name. Moreover, the implementation of the tag name identifier is not limited in the present disclosure. For example, the tag name identifier may be implemented by using an identity document (ID) corresponding to the tag name.

In addition, the storage location of the tag name record table is not limited in the present disclosure. For example, the tag name record table may be stored in a tag data storage space (for example, a tag database shown in FIG. 3) corresponding to the metadata tag service system described above.

In addition, for the first tag name, the tag name record content corresponding to the first tag name refers to record content that needs to be written when related content of the first tag name is recorded in the tag name record table, so that the "tag name record content corresponding to the first tag name" can indicate a record related to the first tag name that exists in the tag name record table. Moreover, the "tag name record content corresponding to the first tag name" may at least include a tag name identifier corresponding to the first tag name, so that a first tag value corresponding to the first tag name can be queried based on the tag name identifier in the future. The tag name identifier corresponding to the first tag name is used to uniquely identify the first tag name.

It can be learned from the foregoing related content of Step 11 that in some application scenarios, for the metadata tag service system described above, after receiving the metadata tag creation request sent by the metadata service gateway, the metadata tag service system may first create a tag name identifier corresponding to the first tag name based on the first tag name carried in the metadata tag creation request, and then write, in the tag name record table based on the tag name identifier corresponding to the first tag name, the tag name record content corresponding to the first tag name, so that the tag name record content includes the tag name identifier corresponding to the first tag name, thereby facilitating querying, based on the tag name identifier in the future, a first tag value corresponding to the first tag name.

Step 12: The metadata tag service system writes, in a tag effect object record table, tag effect object record content corresponding to the first tag effect object description information, where the tag effect object record content includes a tag effect object identifier corresponding to the first tag effect object description information.

The tag effect object record table is configured to record related content of some metadata with a tag.

In addition, the implementation of the tag effect object record table is not limited in the present disclosure. For example, each record in the tag effect object record table may be implemented by using a binary tuple of (tag effect object description information, a tag effect object identifier corresponding to the tag effect object description information). The tag effect object description information is used to describe one piece of metadata or a plurality of pieces of metadata, and the implementation of the tag effect object description information is similar to that of the "first tag effect object description information" described above. For the sake of brevity, details are not described herein again. The tag effect object identifier is used to uniquely identify a tag effect object described by the tag effect object description information. Moreover, the implementation of the tag effect object identifier is not limited in the present disclosure. For example, the tag effect object identifier may be implemented by using an ID corresponding to the tag effect object described by the tag effect object description information.

In addition, the storage location of the tag effect object record table is not limited in the present disclosure. For example, the tag effect object record table may be stored in a tag data storage space (for example, a tag database shown in FIG. 3) corresponding to the metadata tag service system described above.

In addition, for the first tag effect object description information, if the first tag effect object description information is used to describe features of a first tag effect object, the tag effect object record content corresponding to the first tag effect object description information refers to record content that needs to be written when related content of the first tag effect object is recorded in the tag effect object record table, so that the "tag effect object record content corresponding to the first tag effect object description information" can indicate a record related to the first tag effect object that exists in the tag effect object record table. Moreover, the "tag effect object record content corresponding to the first tag effect object description information" may at least include a tag effect object identifier corresponding to the first tag effect object description information. The tag effect object identifier is used to uniquely identify the first tag effect object.

Furthermore, in some application scenarios, to avoid defects caused by repeatedly writing related content of the same tag effect object in the tag effect object record table described above, the present disclosure further provides a possible implementation of Step 12 described above. In this implementation, Step 12 may include: If there is no tag effect object record content corresponding to the first tag effect object description information in the tag effect object record table, writing, in the tag effect object record table, the tag effect object record content corresponding to the first tag effect object description information.

It should be noted that the manner of obtaining the foregoing conclusion that "there is no tag effect object record content corresponding to the first tag effect object description information in the tag effect object record table" is not limited in the present disclosure. For example, it may include: For each record that already exists in the tag effect object record table, determining whether the first tag effect object description information appears in the record. If it is determined that the first tag effect object description information does not appear in each of the records that already exist in the tag effect object record table, it may be determined that there is no tag effect object record content corresponding to the first tag effect object description information in the tag effect object record table. For another example, the manner of obtaining the conclusion may also be: First, creating a tag effect object identifier corresponding to the first tag effect object description information based on the first tag effect object description information. Then, for each record that already exists in the tag effect object record table, determining whether the tag effect object identifier appears in the record. If it is determined that the tag effect object identifier does not appear in each of the records that already exist in the tag effect object record table, it may be determined that there is no tag effect object record content corresponding to the first tag effect object description information in the tag effect object record table.

It can be learned from content of the foregoing two paragraphs that in some application scenarios, for the metadata tag service system described above, after receiving the metadata tag service creation request sent by the metadata service gateway, the metadata tag service system may first create a tag effect object identifier corresponding to the first tag effect object description information based on the first tag effect object description information carried in the metadata tag creation request, and then determine whether there is record content that includes the tag effect object identifier in the tag effect object record table. If there is record content that includes the tag effect object identifier in the tag effect object record table, it may be determined that there is tag effect object record content corresponding to the first tag effect object description information in the tag effect object record table, thereby determining that the tag effect object record content corresponding to the first tag effect object description information has been written in the tag effect object record table. Therefore, to avoid repeated writing, subsequent Step 13 below may be directly performed. However, if there is no record content that includes the tag effect object identifier in the tag effect object record table, it may be determined that there is no tag effect object record content corresponding to the first tag effect object description information in the tag effect object record table. Therefore, the tag effect object record content corresponding to the first tag effect object description information may be directly written in the tag effect object record table, so that the tag effect object record content includes the tag effect object identifier.

It can be learned from the foregoing related content of Step 12 that in some application scenarios, for the metadata tag service system described above, after receiving the metadata tag creation request sent by the metadata service gateway, the metadata tag service system may first create a tag effect object identifier corresponding to the first tag effect object description information based on the first tag effect object description information carried in the metadata tag creation request, and then write, in the tag effect object record table based on the tag effect object identifier, the tag effect object record content corresponding to the first tag effect object description information, so that the tag effect object record content includes the tag effect object identifier corresponding to the first tag effect object description information, thereby facilitating querying, based on the tag effect object identifier in the future, a first tag value corresponding to the first tag effect object description information.

Step 13: The metadata tag service system writes, in a tag value record table, tag value record content corresponding to the first tag value, where the tag value record content is determined based on the first tag value, the tag name identifier corresponding to the first tag name, and the tag effect object identifier corresponding to the first tag effect object description information.

The tag value record table is configured to record related content of a tag value involved in a related tag of some metadata.

In addition, the implementation of the tag value record table is not limited in the present disclosure. For example, each record in the tag value record table may be implemented by using a triplet of (a tag value, a tag name identifier associated with the tag value, and a tag effect object identifier associated with the tag value). The "tag name identifier associated with the tag value" is used to uniquely identify a tag name corresponding to the tag value. The "tag effect object identifier associated with the tag value" is used to uniquely identify a tag effect object corresponding to the tag value.

In addition, the storage location of the tag value record table is not limited in the present disclosure. For example, the tag value record table may be stored in a tag data storage space (for example, a tag database shown in FIG. 3) corresponding to the metadata tag service system described above.

In addition, for the first tag value, the tag value record content corresponding to the first tag value refers to record content that needs to be written when related content of the first tag value is recorded in the tag value record table, so that the "tag value record content corresponding to the first tag value" can indicate a record related to the first tag value that exists in the tag value record table. Moreover, the "tag value record content corresponding to the first tag value" is determined based on the first tag value, the tag name identifier corresponding to the first tag name, and the tag effect object identifier corresponding to the first tag effect object description information, so that the tag value record content corresponding to the first tag value may at least include a triplet of (the first tag value, the tag name identifier corresponding to the first tag name, and the tag effect object identifier corresponding to the first tag effect object description information), thereby facilitating quickly querying the first tag value from the tag value record table based on the tag name identifier and the tag effect object identifier in the future.

It can be learned from the foregoing related content of Step 11 to Step 13 that in some application scenarios, for the metadata tag service system described above, after receiving the metadata tag creation request sent by the metadata service gateway, if the metadata tag creation request carries a first tag name, a first tag value, and first tag effect object description information, a working principle of the metadata tag service system may include: Creating a tag name identifier corresponding to the first tag name based on the first tag name, and writing, in a tag name record table, tag name record content corresponding to the first tag name, so that the tag name record content includes the tag name identifier; creating a tag effect object identifier corresponding to the first tag effect object description information based on the first tag effect object description information, and writing, in a tag effect object record table, tag effect object record content corresponding to the first tag effect object description information, so that the tag effect object record content includes the tag effect object identifier; and then, writing, in a tag value record table based on the tag name identifier, the tag effect object identifier, and the first tag value, tag value record content corresponding to the first tag value, so that the tag creation processing can be implemented.

Case 2: In some application scenarios (for example, a scenario with a large quantity of tags), when the metadata tag creation parameter carried in the metadata tag creation request includes a first tag set name, a first tag name, a first tag value, and first tag effect object description information, the tag creation logic may include the following Step 21 to Step 25, for example.

Step 21: The metadata tag service system writes, in a tag set record table, tag set record content corresponding to the first tag set name, where the tag set record content includes a set identifier corresponding to the first tag set name.

The tag set record table is configured to record related content of a tag set to which a related tag of some metadata belongs.

In addition, the implementation of the tag set record table is not limited in the present disclosure. For example, each record in the tag set record table may be implemented by using a binary tuple of (a tag set name, a set identifier corresponding to the tag set name). The tag set name is used to describe a tag set. The set identifier is used to uniquely identify the tag set described by the tag set name. Moreover, the implementation of the set identifier is not limited in the present disclosure. For example, the set identifier may be implemented by using an ID corresponding to the tag set described by the tag set name.

In addition, the storage location of the tag set record table is not limited in the present disclosure. For example, the tag set record table may be stored in a tag data storage space (for example, a tag database shown in FIG. 3) corresponding to the metadata tag service system described above.

In addition, for the first tag set name, if the first tag set name is used to describe a first tag set, the tag set record content corresponding to the first tag set name refers to record content that needs to be written when related content of the first tag set is recorded in the tag set record table, so that the "tag set record content corresponding to the first tag set name" can indicate a record related to the first tag set that exists in the tag set record table. Moreover, the "tag set record content corresponding to the first tag set name" includes a set identifier corresponding to the first tag set name. The first tag set refers to the tag set described by the first tag set name. The set identifier corresponding to the first tag set name is used to uniquely identify the first tag set.

It can be learned from the foregoing related content of Step 21 that in some application scenarios, for the metadata tag service system described above, after receiving the metadata tag creation request sent by the metadata service gateway, the metadata tag service system may first create a set identifier corresponding to the first tag set name based on the first tag set name carried in the metadata tag creation request, and then write, in a tag set record table based on the set identifier, the tag set record content corresponding to the first tag set name, so that the tag set record content includes the set identifier corresponding to the first tag set name.

Step 22: The metadata tag service system determines tag name record content corresponding to the first tag name based on the set identifier corresponding to the first tag set name and the first tag name.

It should be noted that the implementation of Step 22 is not limited in the present disclosure. For example, in a possible implementation, Step 22 may include the following Step 221 and Step 222, for example.

Step 221: The metadata tag service system creates a tag name identifier corresponding to the first tag name, so that the tag name identifier is used to uniquely identify the first tag name.

It should be noted that the implementation of Step 221 is not limited in the present disclosure. For example, Step 221 may include: The metadata tag service system creates a tag name identifier corresponding to the first tag name based on the first tag name, so that the tag name identifier can indicate features of the first tag name. For another example, Step 221 may include: The metadata tag service system creates a tag name identifier corresponding to the first tag name based on the set identifier corresponding to the first tag set name and the first tag name, so that the tag name identifier can indicate features of the set identifier and features of the first tag name. For another example, Step 221 may include: randomly generating an ID as the tag name identifier corresponding to the first tag name.

It should be noted that the manner of implementing the step of "creating a tag name identifier corresponding to the first tag name based on the set identifier corresponding to the first tag set name and the first tag name" in the foregoing paragraph is not limited in the present disclosure. For example, the step may include: creating a tag name identifier corresponding to the first tag name based on the set identifier corresponding to the first tag set name and the first tag name, so that the tag name identifier is implemented by using a binary tuple of (the set identifier corresponding to the first tag set name, an ID corresponding to the first tag name). For another example, the step may include: performing fusion processing on the set identifier corresponding to the first tag set name and the first tag name, to obtain the tag name identifier corresponding to the first tag name.

Step 222: Determining the tag name record content corresponding to the first tag name based on the first tag name, a tag name identifier corresponding to the first tag name, and the set identifier corresponding to the first tag set name, so that the tag name record content includes the first tag name, the tag name identifier corresponding to the first tag name, and the set identifier.

It should be noted that the implementation of Step 222 is not limited in the present disclosure. For example, the implementation may include: determining the tag name record content corresponding to the first tag name based on a triplet constructed by the first tag name, the tag name identifier corresponding to the first tag name, and the set identifier corresponding to the first tag set name, so that the tag name record content may include the triplet, for example, a triplet similar to (the set identifier corresponding to the first tag set name, the first tag name, and the tag name identifier corresponding to the first tag name), so that after the tag name record content is written in the tag name record table, the tag name record content can be quickly located in the tag name record table based on the set identifier and the first tag name.

It can be learned from the foregoing related content of Step 221 to Step 222 that in some application scenarios, for the metadata tag service system described above, after obtaining the set identifier corresponding to the first tag set name, the metadata tag service system may determine the tag name record content corresponding to the first tag name based on the set identifier, the first tag name, and the tag name identifier corresponding to the first tag name, so that the tag name record content includes the first tag name, the tag name identifier corresponding to the first tag name, and the set identifier, so that after the tag name record content is written in the tag name record table, the tag name record content can be quickly located in the tag name record table based on the set identifier and the first tag name.

Step 23: The metadata tag service system writes, in a tag name record table, tag name record content corresponding to the first tag name, where the tag name record content includes a tag name identifier corresponding to the first tag name.

It should be noted that for related content of Step 23, reference can be made to Step 11 described above.

Step 24: The metadata tag service system writes, in a tag effect object record table, tag effect object record content corresponding to the first tag effect object description information, where the tag effect object record content includes a tag effect object identifier corresponding to the first tag effect object description information.

It should be noted that for related content of Step 24, reference can be made to Step 12 described above.

Step 25: The metadata tag service system writes, in a tag value record table, tag value record content corresponding to the first tag value, where the tag value record content is determined based on the first tag value, the tag name identifier corresponding to the first tag name, and the tag effect object identifier corresponding to the first tag effect object description information.

It should be noted that for related content of Step 25, reference can be made to Step 13 described above.

It can be learned from the foregoing related content of Step 21 to Step 25 that in some application scenarios, for the metadata tag service system described above, after receiving the metadata tag creation request sent by the metadata service gateway, if the metadata tag creation request carries a first tag set name, a first tag name, a first tag value, and first tag effect object description information, a working principle of the metadata tag service system may include: Creating a set identifier corresponding to the first tag set name based on the first tag set name, and writing, in a tag set record table, tag set record content corresponding to the first tag set name, so that the tag set record content includes the set identifier; then creating tag name record content corresponding to the first tag name based on the set identifier and the first tag name, so that the tag name record content includes the tag name identifier, and writing, in a tag name record table, the tag name record content corresponding to the first tag name; creating a tag effect object identifier corresponding to the first tag effect object description information based on the first tag effect object description information, and writing, in a tag effect object record table, tag effect object record content corresponding to the first tag effect object description information, so that the tag effect object record content includes the tag effect object identifier; and then, writing, in a tag value record table based on the tag name identifier, the tag effect object identifier, and the first tag value, tag value record content corresponding to the first tag value, so that the tag creation processing can be implemented.

It can be learned from the foregoing related content of S401 to S402 that for the metadata tag service system (for example, the metadata tag service system 203 shown in FIG. 2 or the metadata tag service system shown in FIG. 3) provided in the present disclosure, a working principle of the metadata tag service system may include: After a metadata service gateway (Gateway) determines a metadata tag creation request based on a metadata tag creation parameter (for example, parameters such as a tag set name, a tag name, a tag effect object, and a tag value) provided by a certain data engine (for example, an engine such as Spark), the metadata service gateway sends the metadata tag creation request to a metadata tag service system, so that the metadata tag service system can execute a tag creation logic based on the metadata tag creation parameter carried in the metadata tag creation request, to implement a metadata tag creation requirement described by the metadata tag creation request, thereby implementing a requirement for tagging one piece of metadata or a plurality of pieces of metadata, and further implementing finer-grained tagging processing, so that defects caused by implementing the tagging processing by adding a new parameter to attribute information (properties) of a metadata database, a metadata table, or a metadata partition can be effectively avoided, thereby effectively improving the tagging effect.

In addition, in some application scenarios, to better improve the tagging experience, the present disclosure further provides a possible implementation of the lakehouse metadata tag creation method described above. In this implementation, the lakehouse metadata tag creation method not only includes S401 to S402 described above, but may further include the following Step 31 and Step 32.

Step 31: If the metadata tag service system detects that the tag creation logic has been executed, the metadata tag service system generates feedback information corresponding to the metadata tag creation request.

The feedback information is configured to indicate that the metadata tag service system has processed the metadata tag creation request, so that the feedback information can indicate that the metadata tag service system has completed a metadata tag creation requirement described by the metadata tag creation request.

In addition, the implementation of the feedback information is not limited in the present disclosure. For example, when the metadata tag creation parameter carried in the metadata tag creation request includes a first tag set name, a first tag name, a first tag value, and first tag effect object description information, the feedback information may be implemented by using a tag obtained by combining the first tag value, a set identifier corresponding to the first tag set name, a tag name identifier corresponding to the first tag name, and a tag effect object identifier corresponding to the first tag effect object description information.

It can be learned from the foregoing content that in a possible implementation, when the metadata tag creation parameter carried in the metadata tag creation request includes a first tag set name, a first tag name, a first tag value, and first tag effect object description information, Step 31 may include: If the metadata tag service system detects that the tag creation logic has been executed, the metadata tag service system combines the first tag value, a set identifier corresponding to the first tag set name, a tag name identifier corresponding to the first tag name, and a tag effect object identifier corresponding to the first tag effect object description information to obtain feedback information, so that the feedback information carries a tag obtained by combining the first tag value, the set identifier corresponding to the first tag set name, the tag name identifier corresponding to the first tag name, and the tag effect object identifier corresponding to the first tag effect object description information, thereby enabling the feedback information to convey: what tag is created for which piece of metadata in a process of processing the metadata tag creation request.

Step 32: The metadata tag service system sends the feedback information to the metadata service gateway, and the metadata service gateway is configured to forward the feedback information to the data engine.

In the present disclosure, for the metadata tag service system described above, after generating the feedback information corresponding to the metadata tag creation request, the metadata tag service system may send the feedback information to the metadata service gateway, so that the metadata service gateway forwards the feedback information to the data engine, so that both the metadata service gateway and the data engine can learn, from the feedback information, that the metadata tag service system has processed the metadata tag creation request, which is beneficial to improving the tagging experience.

It can be learned from the foregoing related content of Step 31 to Step 32 that for the metadata tag service system (for example, the metadata tag service system 203 shown in FIG. 2 or the metadata tag service system shown in FIG. 3) provided in the present disclosure, the metadata tag service system can not only perform metadata tag creation processing based on the metadata tag creation request described above, but also feed back a processing status (for example, the feedback information described above) of the metadata tag creation request to the data engine by using the metadata service gateway described above, so that the data engine can learn in a timely manner that the metadata tag service system has processed the metadata tag creation request, which is beneficial to improving the tagging experience.

Figure 5:
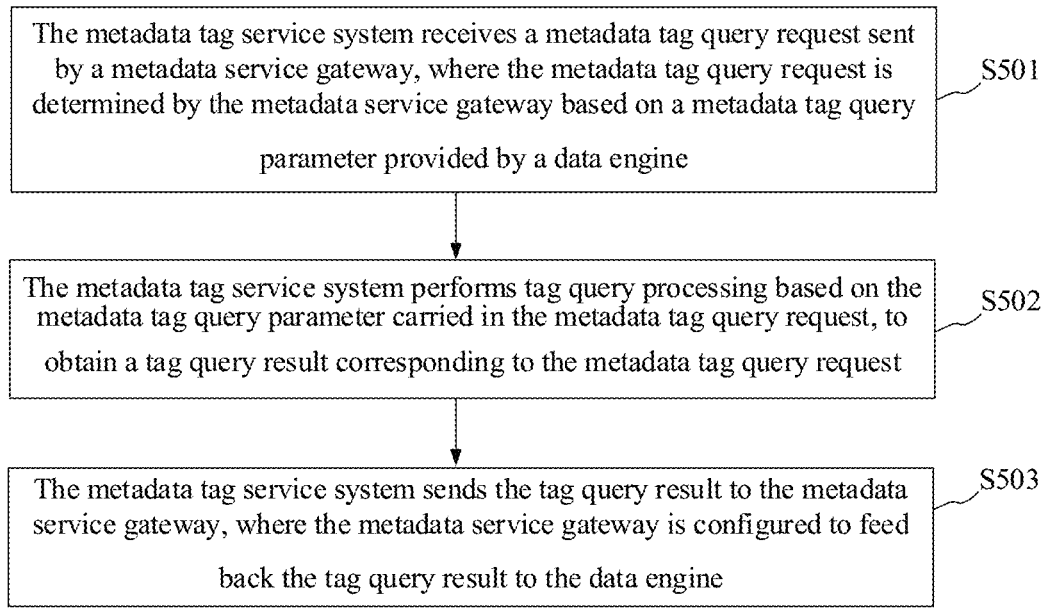
FIG. 5 is a flowchart of a lakehouse metadata tag query method according to an embodiment of the present disclosure.

In addition, based on the foregoing lakehouse metadata tag creation method, the present disclosure further provides a lakehouse metadata tag query method. As shown in FIG. 5, the lakehouse metadata tag query method provided in this embodiment of the present disclosure includes the following S501 to S503. FIG. 5 is a flowchart of a lakehouse metadata tag query method according to an embodiment of the present disclosure.

S501: The metadata tag service system receives a metadata tag query request sent by the metadata service gateway, where the metadata tag query request is determined by the metadata service gateway based on a metadata tag query parameter provided by a data engine.

The metadata tag service system may be configured not only to perform tag creation processing by using any one of the implementations of the lakehouse metadata tag creation method provided in the present disclosure, but also to perform query processing on a tag created by using the lakehouse metadata tag creation method. Furthermore, for related content of the query processing, reference can be made to related content of the lakehouse metadata tag query method provided in the present disclosure.

The metadata tag query request is a request that is sent by the metadata service gateway described above and is used to request to query a related tag of one piece of metadata or a plurality of pieces of metadata. It can be seen that in a possible implementation, the data tag creation request may be used to request to query a tag corresponding to one piece of metadata or a plurality of pieces of metadata.

In addition, for the metadata tag query request described above, the metadata tag query request is determined by the metadata service gateway based on a metadata tag query parameter provided by the data engine described above, so that the metadata tag query request carries the metadata tag query parameter, and the metadata tag query request can indicate: what tag is to be queried for which piece of metadata. The metadata tag query parameter refers to a parameter (for example, a tag set name, a tag name, a tag effect object, or the like) that is provided by the data engine and is required for tag query processing on one piece of metadata or a plurality of pieces of metadata, so that the metadata tag query parameter is used to indicate elements (for example, two elements: a tag name and a tag effect object, or three elements: a tag set name, a tag name, and a tag effect object) required for tag query.

In addition, the implementation of the metadata tag query parameter in the foregoing paragraph is not limited in the present disclosure. For ease of understanding, in the following, description is given with reference to two cases.

Case 1: In some application scenarios (for example, a scenario with a small quantity of tags), for a tag of metadata, if three elements that constitute the tag include a tag name, a tag value, and an object on which the tag acts, the related tag of the metadata may be directly stored based on the three elements, and does not need to be stored by constructing a tag set (for example, a library or the like).

It can be learned from the foregoing related content of Case 1 that in a possible implementation, the metadata tag query parameter may include a second tag name and second tag effect object description information. The second tag effect object description information refers to information used to describe a tag effect object and required for tag query processing on one piece of metadata or a plurality of pieces of metadata. Moreover, the second tag effect object description information may be used to describe a second tag effect object. The second tag effect object refers to an object for which tag query processing needs to be performed (that is, an object described by the second tag effect object description information). Moreover, the second tag effect object is not limited in the present disclosure. For example, the second tag effect object may include one piece of metadata or a plurality of pieces of metadata. The second tag name refers to a tag name required for tag query processing on the second tag effect object. It should be noted that the implementation of the second tag effect object description information is similar to that of the first tag effect object description information described above. For the sake of brevity, details are not described herein again.

Case 2: In some application scenarios (for example, a scenario with a large quantity of tags), a related tag of metadata may need to be stored by constructing a tag set (for example, a library or the like), which is beneficial to improving the tag storage effect and subsequent tag query efficiency.

It can be learned from the foregoing related content of Case 2 that in a possible implementation, the metadata tag query parameter may include a second tag set name, a second tag name, and second tag effect object description information. The second tag set name refers to a name of a second tag set, so that the second tag set name indicates a set to which a tag described by the second tag name and the second tag effect object description information belongs. The second tag set refers to a set described by the second tag set name. Moreover, at least a tag described by the second tag name and the second tag effect object description information is recorded in the second tag set.

In addition, the implementation of the data engine providing the metadata tag query parameter is not limited in the present disclosure. For example, the implementation of the data engine providing the metadata tag query parameter is similar to the implementation of the data engine providing the metadata tag creation parameter described above. For the sake of brevity, details are not described herein again.

It can be learned from the foregoing related content of S501 that in some application scenarios, when at least one data engine has accessed a metadata service gateway in the foregoing lakehouse metadata management system, if a certain data engine sends a metadata tag obtaining request to the metadata service gateway, the metadata service gateway may determine a metadata tag query request based on the metadata tag obtaining request (for example, directly determining the metadata tag obtaining request as the metadata tag query request), and send the metadata tag query request to the metadata tag service system, so that the metadata tag service system can perform tag query processing based on a metadata tag query parameter carried in the metadata tag query request. The metadata tag obtaining request is used to request to perform tag query processing on one piece of metadata or a plurality of pieces of metadata. Moreover, the metadata tag obtaining request carries the metadata tag query parameter. In addition, the implementation of the metadata tag obtaining request is not limited in the present disclosure.

S502: The metadata tag service system performs tag query processing based on the metadata tag query parameter carried in the metadata tag query request, to obtain a tag query result corresponding to the metadata tag query request.

The tag query result corresponding to the metadata tag query request refers to a processing result obtained by the metadata tag service system described above by processing the metadata tag query request, so that the tag query result can indicate a tag requested by the metadata tag query request.

In addition, the implementation of S502 described above is not limited in the present disclosure. For ease of understanding, in the following, description is given with reference to two cases.

Case 1: In some application scenarios (for example, a scenario with a small quantity of tags), when the metadata tag query parameter carried in the metadata tag query request includes a second tag name and second tag effect object description information, S502 described above may specifically include the following Step 41 to Step 44.

Step 41: The metadata tag service system searches, in a tag name record table, for a tag name identifier corresponding to the second tag name.

In the present disclosure, for the metadata tag service system described above, after receiving the metadata tag query request sent by the metadata service gateway described above, the metadata tag service system may query the tag name record table described above based on the second tag name carried in the metadata tag query request, to obtain the tag name identifier corresponding to the second tag name, so that the tag name identifier is used to uniquely identify the second tag name.

Step 42: The metadata tag service system searches, in a tag effect object record table, for a tag effect object identifier corresponding to the second tag effect object description information.

In the present disclosure, for the metadata tag service system described above, after receiving the metadata tag query request sent by the metadata service gateway described above, the metadata tag service system may query the tag effect object record table described above based on the second tag effect object description information carried in the metadata tag query request, to obtain the tag effect object identifier corresponding to the second tag effect object description information, so that the tag effect object identifier is used to uniquely identify a second tag effect object described by the second tag effect object description information.

Step 43: The metadata tag service system queries a tag value record table based on the tag name identifier corresponding to the second tag name and the tag effect object identifier corresponding to the second tag effect object description information, to obtain a second tag value.

In the present disclosure, for the metadata tag service system described above, after querying the tag name identifier corresponding to the second tag name and the tag effect object identifier corresponding to the second tag effect object description information described above, the metadata tag service system queries the tag value record table described above based on the tag name identifier and the tag effect object identifier, to obtain the second tag value, so that the second tag value can indicate a tag value that is recorded in the tag value record table and that is associated with the tag name identifier and the tag effect object identifier.

Step 44: Determining the tag query result corresponding to the metadata tag query request based on the second tag value.

It should be noted that the implementation of Step 44 is not limited in the present disclosure. For example, Step 44 may include: determining the second tag value as the tag query result corresponding to the metadata tag query request. For another example, Step 44 may include: combining the second tag value, the second tag name, and the second tag effect object description information to obtain the tag query result corresponding to the metadata tag query request, so that the tag query result can more directly indicate a tag obtained through query. For another example, Step 44 may include: combining the second tag value, a tag name identifier corresponding to the second tag name, and a tag effect object identifier corresponding to the second tag effect object description information into a tag, and using the tag as the tag query result corresponding to the metadata tag query request, so that the tag query result can more comprehensively indicate: what information is obtained through query in a process of processing the metadata tag query request.

It can be learned from the foregoing related content of Step 41 to Step 44 that in some application scenarios, for the metadata tag service system described above, after receiving the metadata tag query request sent by the metadata service gateway described above, if the metadata tag query request carries a second tag name and second tag effect object description information, a working principle of the metadata tag service system may include: First, querying the tag name record table based on the second tag name to obtain a tag name identifier corresponding to the second tag name, and querying the tag effect object record table based on the second tag effect object description information to obtain a tag effect object identifier corresponding to the second tag effect object description information. Then, querying a tag value record table based on the tag name identifier and the tag effect object identifier to obtain a second tag value. Finally, combining the second tag value, the tag name identifier, and the tag effect object identifier into a tag, and using the tag as the tag query result corresponding to the metadata tag query request, so that the tag query result can more comprehensively indicate the information obtained through query for the data tag query request, which is beneficial to improving the query experience.

Case 2: In some application scenarios (for example, a scenario with a large quantity of tags), when the metadata tag query parameter carried in the metadata tag query request includes a second tag set name, a second tag name, and second tag effect object description information, S502 described above may specifically include the following Step 51 to Step 55.

Step 51: The metadata tag service system searches, in a tag set record table, for a set identifier corresponding to the second tag set name.

In the present disclosure, for the metadata tag service system described above, after receiving the metadata tag query request sent by the metadata service gateway described above, the metadata tag service system may query the tag set record table described above based on the second tag set name carried in the metadata tag query request, to obtain the set identifier corresponding to the second tag set name, so that the set identifier is used to uniquely identify a second tag set described by the second tag set name. The second tag set refers to a set having the second tag set name.

Step 52: The metadata tag service system queries a tag name record table based on the set identifier corresponding to the second tag set name and the second tag name, to obtain a tag name identifier corresponding to the second tag name.

In the present disclosure, for the metadata tag service system described above, after receiving the metadata tag query request sent by the metadata service gateway and having inquired the set identifier corresponding to the second tag set name described above, the metadata tag service system may query the tag name record table described above based on the set identifier and the second tag name carried in the metadata tag query request, to obtain the tag name identifier corresponding to the second tag name, so that the tag name identifier is used to uniquely identify the second tag name.

Step 53: The metadata tag service system searches, in a tag effect object record table, for a tag effect object identifier corresponding to the second tag effect object description information.

It should be noted that for related content of Step 53, reference can be made to the related content of Step 42 described above.

Step 54: The metadata tag service system queries a tag value record table based on the tag name identifier corresponding to the second tag name and the tag effect object identifier corresponding to the second tag effect object description information, to obtain a second tag value.

It should be noted that for related content of Step 54, reference can be made to the related content of Step 43 described above.

Step 55: The metadata tag service system determines the tag query result corresponding to the metadata tag query request based on the second tag value.

It should be noted that the implementation of Step 55 is not limited in the present disclosure. For example, Step 55 may include: determining the second tag value as the tag query result corresponding to the metadata tag query request. For another example, Step 55 may include: combining the second tag value, the second tag set name, the second tag name, and the second tag effect object description information to obtain the tag query result corresponding to the metadata tag query request, so that the tag query result can more directly indicate: what tag is obtained through query. For another example, Step 55 may include: combining the second tag value, a set identifier corresponding to the second tag set name, a tag name identifier corresponding to the second tag name, and a tag effect object identifier corresponding to the second tag effect object description information into a tag, and using the tag as the tag query result corresponding to the metadata tag query request.

It can be seen that in a possible implementation, Step 55 may include: The metadata tag service system combines a set identifier corresponding to the second tag set name, a tag name identifier corresponding to the second tag name, a tag effect object identifier corresponding to the second tag effect object description information into a tag, and combines the tag and the second tag value to obtain the tag query result corresponding to the metadata tag query request, so that the tag query result can more comprehensively indicate the information obtained through query for the data tag query request, which is beneficial to improving the query experience.

It can be learned from the foregoing related content of Step 51 to Step 55 that in some application scenarios, for the metadata tag service system described above, after receiving the metadata tag query request sent by the metadata service gateway described above, if the metadata tag query request carries a second tag set name, a second tag name, and second tag effect object description information, a working principle of the metadata tag service system may include: Querying the tag set record table based on the second tag set name to obtain a set identifier corresponding to the second tag set name; querying a tag name record table based on the set identifier and the second tag name to obtain a tag name identifier corresponding to the second tag name; querying a tag effect object record table based on the second tag effect object description information to obtain a tag effect object identifier corresponding to the second tag effect object description information; querying a tag value record table based on the tag name identifier and the tag effect object identifier to obtain a second tag value; and combining the second tag value, the set identifier corresponding to the second tag set name, the tag name identifier corresponding to the second tag name, and the tag effect object identifier corresponding to the second tag effect object description information into a tag, and using the tag as the tag query result corresponding to the metadata tag query request, so that the tag query result can more comprehensively indicate the information obtained through query for the data tag query request, which is beneficial to improving the query experience.

It can be learned from the foregoing related content of S502 that for the metadata tag service system described above, after receiving the metadata tag query request sent by the metadata service gateway described above, the metadata tag service system may perform tag query logic (for example, logic described in Step 41 to Step 44 or logic described in Step 51 to Step 55) based on the metadata tag query parameter carried in the metadata tag query request, to obtain the tag query result corresponding to the metadata tag query request. The tag query logic refers to logic pre-configured for the metadata tag service system and used to implement the tag query processing.

S503: The metadata tag service system sends the tag query result to the metadata service gateway, and the metadata service gateway is configured to feed back the tag query result to the data engine.

In the present disclosure, for the lakehouse metadata management system described above, after the metadata tag service system in the lakehouse metadata management system obtains the tag query result by processing the metadata tag query request, the metadata tag service system sends the tag query result to the metadata service gateway in the lakehouse metadata management system, so that the metadata service gateway feeds back the tag query result to the data engine, so that both the metadata service gateway and the data engine can learn a processing status of the metadata tag query request from the tag query result.

It can be learned from the foregoing related content of S501 to S503 that for the metadata tag service system (for example, the metadata tag service system 203 shown in FIG. 2 or the metadata tag service system shown in FIG. 3) provided in the present disclosure, after the metadata tag service system stores, in a tag data storage space corresponding to the metadata tag service system by executing the lakehouse metadata tag creation method provided in the present disclosure, related tags of some metadata, the metadata tag service system can query the tags from the storage space by executing the lakehouse metadata tag query method provided in the present disclosure, so that defects caused by implementing the tagging processing and the corresponding tag query processing by adding a new parameter to attribute information (properties) of a metadata database, a metadata table, or a metadata partition can be effectively avoided, thereby effectively improving the tag query effect.

In addition, the tag recording manner in the metadata tag service system described above is not limited in the present disclosure. For ease of understanding, in the following, description is given with reference to examples.

As an example, in some application scenarios, for the metadata tag service system described above, a tag in the metadata tag service system may meet constraints shown in (1) to (3) below.

(1) For a tag in the metadata tag service system (for example, a tag described by the first tag set name, the first tag name, the first tag value, and the first tag effect object description information described above), the tag may be stored in MySQL, and horizontal scaling may be implemented by using a database sharding solution.

(2) For a tag in the metadata tag service system, elements involved in the tag may include a tag set name, a tag name, a tag value, and a tag effect object, and the four elements respectively correspond to four data elements of TagGroup, TagKey, TagValue, and TagSubject in the metadata tag service system.

For the data element of TagGroup described above, TagGroup is used to represent a set of tags, and the quantity of TagKey in each TagGroup may be limited as required, for example, not more than 1,000. In addition, a TagGroup name (that is, the tag set name) is globally unique, and all access must be performed based on a specified TagGroup name. In addition, the implementation of TagGroup is not limited in the present disclosure. For example, TagGroup may be implemented by using a set identifier corresponding to a tag set.

For the data element of TagKey described above, TagKey is used to represent a name of a tag (that is, the tag name), and it is required that TagKey is unique under a specified TagGroup, but may not be required to be globally unique. In addition, the implementation of TagKey is not limited in the present disclosure. For example, TagKey may be implemented by using a tag name identifier corresponding to a tag name.

For the data element of TagValue described above, TagValue is used to represent a specific value of a tag (that is, the tag value), and it is required to specify information about a tag name and an effect object for TagValue (for example, associating TagValue with a tag name identifier and a tag effect object identifier). In addition, it is required that TagValue can only be associated with a specific TagKey. In addition, the implementation of TagValue is not limited in the present disclosure. For example, TagValue may be implemented by using a tag value.

Figure 6:
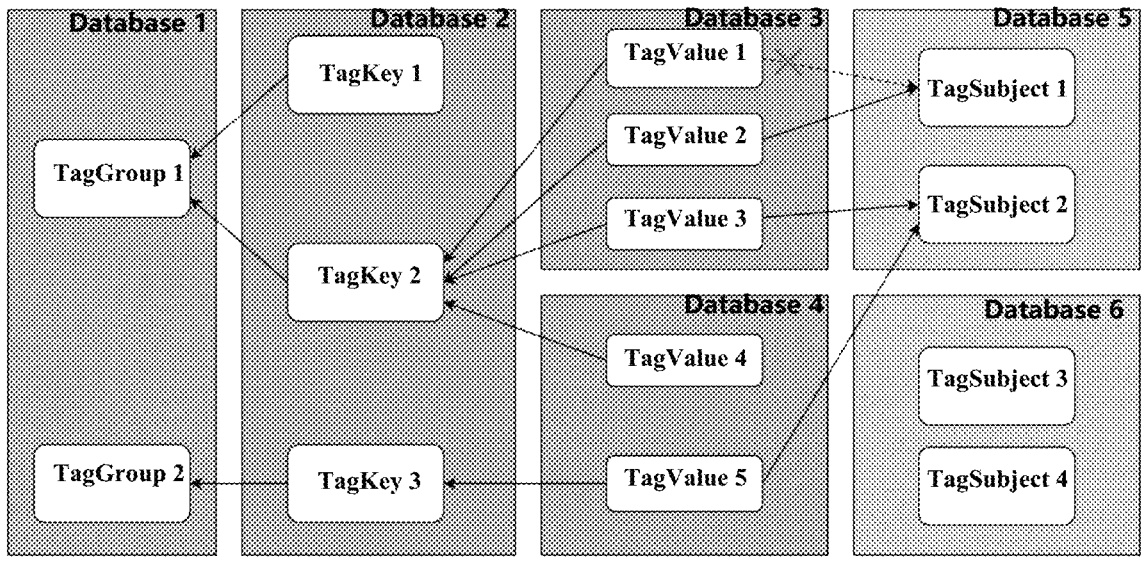
FIG. 6 is a schematic diagram of a storage manner of tag data according to an embodiment of the present disclosure.

For the data element of TagSubject described above, TagSubject is used to represent an object on which a tag acts (that is, the tag effect object), the object may be one piece of metadata or a plurality of pieces of metadata, and description information of the object may include a namespace (used to distinguish data sources, such as Hive, ClickHouse, or the like), a db_name (database name), a tbl_name (table name), a col_name (column name), a row_expression (row expression, such as score=90), and a part_name (partition name, such as date='20230612'). In addition, it is required that TagSubject is globally unique. In addition, one TagSubject may be marked by a plurality of TagKey, and associated with a plurality of TagValue. One TagKey cannot be bound to the same TagSubject (such as TagSubject1 shown in FIG. 6) for multiple times. In addition, the implementation of TagSubject is not limited in the present disclosure. For example, TagSubject may be implemented by using a tag effect object identifier corresponding to an object on which a tag acts.

(3) For a tag in the metadata tag service system described above, the tag may be recorded and stored by using four underlying tables: a tag_subject table (for example, the tag effect object record table described above), a tag_group table (for example, the tag set record table described above), a tag_key table (for example, the tag name record table described above), and a tag_value table (for example, the tag value record table described above).

For the tag_subject table described above, the tag_subject table is used to record related content (for example, a tag effect object identifier, tag effect object description information, or the like) of each tag effect object. Because the data volume in the tag_subject table may be relatively large, a database sharding processing needs to be performed on the tag_subject table. In addition, a unique index needs to be created for the related content of each tag effect object in the tag_subject table, to ensure uniqueness and accelerate access.

For the tag_group table described above, the tag_group table is used to record related content (for example, a set identifier, a tag set name, or the like) of each tag set. Because the data volume in the tag_group table is usually not too large, and the tag_group table needs to support querying tag sets that meet a certain condition, there is no need to use the database sharding solution for the tag_group table, the tag set name needs to be globally unique, and a unique key is used to ensure uniqueness and accelerate access.

For the tag_key table described above, the tag_key table is used to record related content (for example, a tag name identifier, a tag name, or the like) of each tag name. Because one TagKey can only belong to one TagGroup so that a data volume in the tag_key table is not too large, the database sharding processing solution does not need to be used for the tag_key table. In addition, duplicate TagKey is not allowed in one TagGroup, and a unique key is used to ensure uniqueness and accelerate access.

For the tag_value table described above, the tag_value table is used to record related content (for example, the tag value, a tag name identifier corresponding to the tag value, a tag effect object identifier corresponding to the tag value, or the like) of each tag value. Because the data volume in the tag_value table is relatively large, the database sharding solution may be used for the tag_value table. In addition, because one tag value in the tag_value table needs to be associated with TagKey and TagSubject respectively, an index needs to be created on a foreign key associated with TagSubject and TagKey respectively, to accelerate access. In addition, one TagValue can only belong to one TagKey, and TagKey belongs to one TagGroup. In addition, a same tag is not allowed to be applied to a same TagSubject repeatedly, that is, one TagSubject cannot be associated with a same TagKey for multiple times, and a unique key is used for constraining.

It can be learned from the foregoing related content of the tag that for the metadata tag service system in the lakehouse metadata management system described above, because the tag in the metadata tag service system meets the constraints shown in (1) to (3), the creation process and the query process of the tag do not cause any interference to the metadata storage system in the lakehouse metadata management system, so that the tag service can be accessed at a low cost without affecting the service stability of the metadata storage system.

Figure 7:
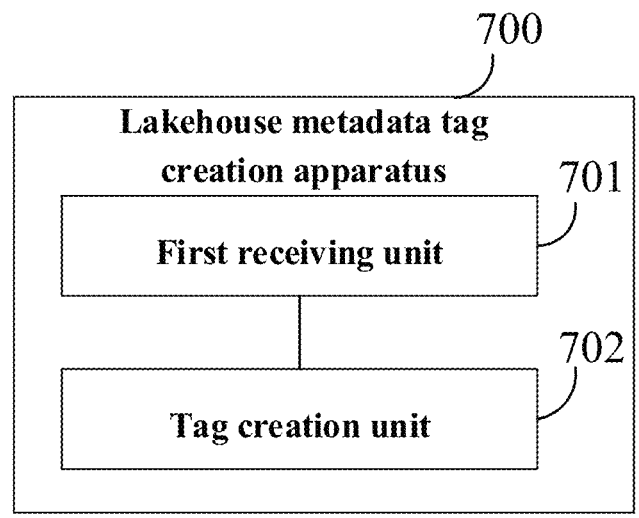
FIG. 7 is a schematic diagram of a structure of a lakehouse metadata tag creation apparatus according to an embodiment of the present disclosure.

Based on the lakehouse metadata tag creation method provided in the embodiment of the present disclosure, an embodiment of the present disclosure further provides a lakehouse metadata tag creation apparatus. In the following, the lakehouse metadata tag creation apparatus is described with reference to FIG. 7. FIG. 7 is a schematic diagram of a structure of a lakehouse metadata tag creation apparatus according to an embodiment of the present disclosure. It should be noted that for technical details of the lakehouse metadata tag creation apparatus provided in this embodiment of the present disclosure, reference can be made to related content of the lakehouse metadata tag creation method described above.

As shown in FIG. 7, a lakehouse metadata tag creation apparatus 700 provided in this embodiment of the present disclosure includes:

a first receiving unit 701, configured to receive a metadata tag creation request sent by a metadata service gateway, where the metadata tag creation request is determined by the metadata service gateway based on a metadata tag creation parameter provided by a data engine, the metadata tag creation parameter includes a first tag name, a first tag value, and first tag effect object description information; and a tag creation unit 702, configured to execute a tag creation logic based on the metadata tag creation parameter carried in the metadata tag creation request.

In a possible implementation, the metadata tag creation parameter includes a first tag name, a first tag value, and first tag effect object description information; and the tag creation unit 702 includes:

a first writing subunit, configured to write, in a tag name record table, tag name record content corresponding to the first tag name, where the tag name record content includes a tag name identifier corresponding to the first tag name;

a second writing subunit, configured to write, in a tag effect object record table, tag effect object record content corresponding to the first tag effect object description information, where the tag effect object record content includes a tag effect object identifier corresponding to the first tag effect object description information; and a third writing subunit, configured to write, in a tag value record table, tag value record content corresponding to the first tag value, where the tag value record content is determined based on the first tag value, the tag name identifier, and the tag effect object identifier.

In a possible implementation, the metadata tag creation parameter further includes a first tag set name; and the tag creation unit 702 further includes:

a fourth writing subunit, configured to write, in a tag set record table, tag set record content corresponding to the first tag set name, where the tag set record content includes a set identifier corresponding to the first tag set name; and a first determining subunit, configured to determine, based on the set identifier and the first tag name, tag name record content corresponding to the first tag name.

In a possible implementation, the second writing subunit is specifically configured to: If there is no tag effect object record content corresponding to the first tag effect object description information in the tag effect object record table, write, in the tag effect object record table, tag effect object record content corresponding to the first tag effect object description information.

In a possible implementation, the lakehouse metadata tag creation apparatus 700 further includes:
  an information generation unit, configured to generate feedback information corresponding to the metadata tag creation request if it is detected that the tag creation logic has been executed; and
  an information sending unit, configured to send the feedback information to the metadata service gateway, where the metadata service gateway is configured to forward the feedback information to the data engine.

In a possible implementation, the metadata tag creation parameter includes a first tag set name, a first tag name, a first tag value, and first tag effect object description information; and
  the information generation unit is specifically configured to: If it is detected that the tag creation logic has been executed, combine the first tag value, a set identifier corresponding to the first tag set name, a tag name identifier corresponding to the first tag name, and a tag effect object identifier corresponding to the first tag effect object description information to obtain the feedback information.

In a possible implementation, the metadata tag creation request is used to request to create a tag corresponding to one piece of metadata or a plurality of pieces of metadata; the one piece of metadata or the plurality of pieces of metadata are managed by a metadata storage system; the metadata service gateway is configured to route a metadata processing request sent by the data engine to the metadata storage system, and the metadata storage system is configured to execute data processing logic corresponding to the metadata processing request.

In a possible implementation, the lakehouse metadata tag creation apparatus 700 is deployed in a metadata tag service system.

It can be learned from the foregoing related content of the lakehouse metadata tag creation apparatus 700 that for the lakehouse metadata tag creation apparatus 700 provided in this embodiment of the present disclosure, after a metadata service gateway (Gateway) determines a metadata tag creation request based on a metadata tag creation parameter (for example, parameters such as a tag set name, a tag name, a tag effect object, and a tag value) provided by a certain data engine (for example, an engine such as Spark), the metadata service gateway sends the metadata tag creation request to the lakehouse metadata tag creation apparatus 700, so that the lakehouse metadata tag creation apparatus 700 can execute the tag creation logic based on the metadata tag creation parameter carried in the metadata tag creation request, to implement a metadata tag creation requirement described by the metadata tag creation request, thereby implementing a tagging requirement for one piece of metadata or a plurality of pieces of metadata, and further implementing tagging processing with a finer granularity, so that defects caused by implementing the tagging processing by adding a new parameter to attribute information (properties) of a metadata database, a metadata table, or a metadata partition can be effectively avoided, thereby effectively improving the tagging effect.

Figure 8:
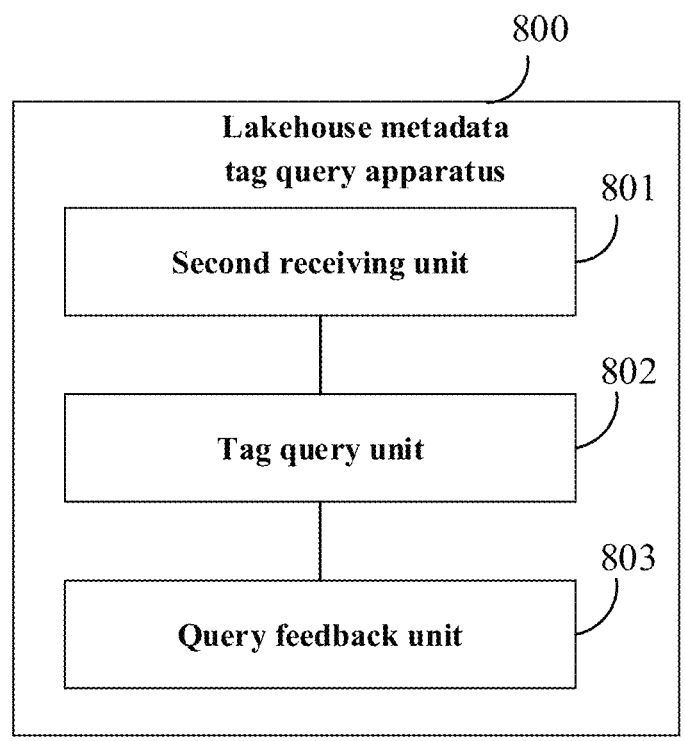
FIG. 8 is a schematic diagram of a structure of a lakehouse metadata tag query apparatus according to an embodiment of the present disclosure.

Based on the lakehouse metadata tag query method provided in the embodiment of the present disclosure, an embodiment of the present disclosure further provides a lakehouse metadata tag query apparatus. In the following, the lakehouse metadata tag query apparatus is described with reference to FIG. 8. FIG. 8 is a schematic diagram of a structure of a lakehouse metadata tag query apparatus according to an embodiment of the present disclosure. It should be noted that for technical details of the lakehouse metadata tag query apparatus provided in this embodiment of the present disclosure, reference can be made to related content of the lakehouse metadata tag query method described above.

As shown in FIG. 8, a lakehouse metadata tag query apparatus 800 provided in this embodiment of the present disclosure includes:
  a second receiving unit 801, configured to receive a metadata tag query request sent by a metadata service gateway, where the metadata tag query request is determined by the metadata service gateway based on a metadata tag query parameter provided by a data engine;
  a tag query unit 802, configured to perform tag query processing based on the metadata tag query parameter carried in the metadata tag query request, to obtain a tag query result corresponding to the metadata tag query request; and
  a query feedback unit 803, configured to send the tag query result to the metadata service gateway, where the metadata service gateway is configured to feed back the tag query result to the data engine.

In a possible implementation, the metadata tag query parameter includes a second tag name and second tag effect object description information; and
  the tag query unit 802 includes:
  a first search subunit, configured to search, in a tag name record table, for a tag name identifier corresponding to the second tag name;
  a second search subunit, configured to search, in a tag effect object record table, for a tag effect object identifier corresponding to the second tag effect object description information;
  a third search subunit, configured to query a tag value record table based on the tag name identifier and the tag effect object identifier, to obtain a second tag value; and
  a second determining subunit, configured to determine the tag query result based on the second tag value.

In a possible implementation, the metadata tag creation parameter further includes a second tag set name; and
  the tag query unit 802 further includes:
  a fourth search subunit, configured to search, in a tag set record table, for a set identifier corresponding to the second tag set name; and
  the first search subunit is specifically configured to: query the tag name record table based on the set identifier and the second tag name, to obtain the tag name identifier corresponding to the second tag name.

In a possible implementation, the second determining subunit is specifically configured to: combine the set identifier, the tag name identifier, the tag effect object identifier, and the second tag value to obtain the tag query result.

In a possible implementation, the lakehouse metadata tag query apparatus 800 is deployed in a metadata tag service system.

It can be learned from the foregoing related content of the lakehouse metadata tag query apparatus 800 that for the lakehouse metadata tag query apparatus 800 provided in this embodiment of the present disclosure, if related tags of some metadata are stored in a storage space in advance by executing the lakehouse metadata tag creation method provided in the present disclosure, the lakehouse metadata tag query apparatus 800 can be used to query the tags from the storage space, so that defects caused by implementing the tagging processing and the corresponding tag query processing by adding a new parameter to attribute information (properties) of a metadata database, a metadata table, or a metadata partition can be effectively avoided, thereby effectively improving the tag query effect.

In addition, an embodiment of the present disclosure further provides an electronic device. The device includes a processor and a memory. The memory is configured to store an instruction or a computer program; and the processor is configured to execute the instruction or the computer program in the memory, so that the electronic device executes any implementation of the lakehouse metadata tag creation method or any implementation of the lakehouse metadata tag query method provided in the embodiments of the present disclosure.

Figure 9:
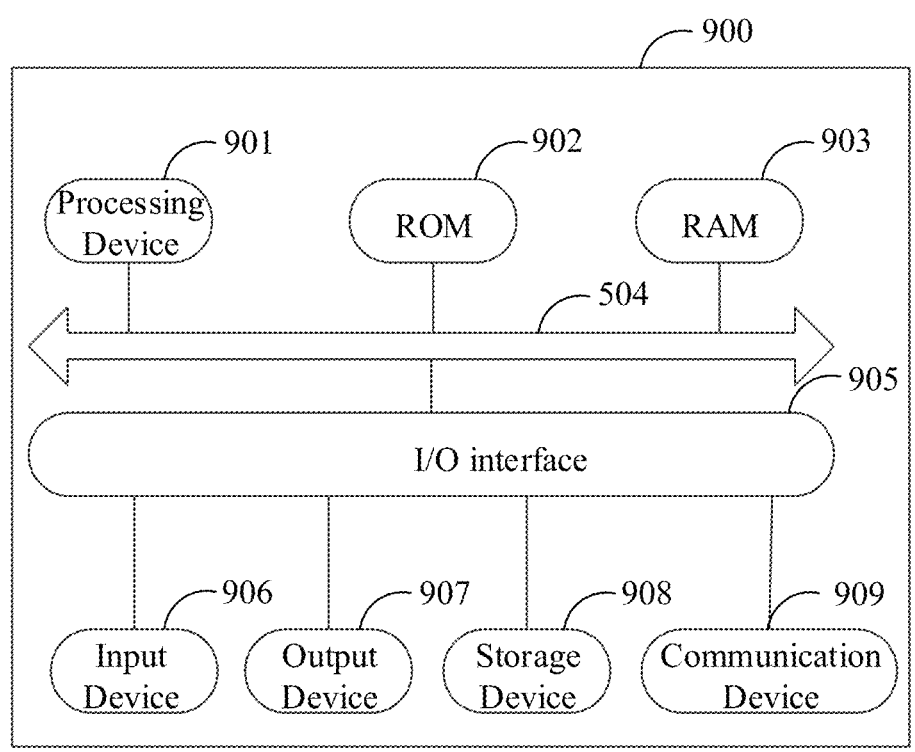
FIG. 9 is a schematic diagram of a structure of an electronic device according to an embodiment of the present disclosure.

FIG. 9 shows a schematic diagram of a structure of an electronic device 900 suitable for implementing an embodiment of the present disclosure. A terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 9 is merely an example, and shall not impose any limitation on the function and scope of use of the embodiments of the present disclosure.

As shown in FIG. 9, the electronic device 900 may include a processing device (for example, a central processor, a graphics processor, or the like) 901, which may perform various appropriate actions and processes in accordance with a program stored in a read-only memory (ROM) 902 or a program loaded from a storage device 908 into a random-access memory (RAM) 903. The RAM 903 further stores various programs and data required for the operations of the electronic device 900. The processing device 901, the ROM 902, and the RAM 903 are connected to each other through a bus 904. An input/output (I/O) interface 905 is also connected to the bus 904.

Generally, the following devices may be connected to the I/O interface 905: an input device 906 including, for example, a touchscreen, a touchpad, a keyboard, a mouse, a camera, a microphone, an accelerometer, and a gyroscope; an output device 907 including, for example, a liquid crystal display (LCD), a speaker, and a vibrator; the storage device 908 including, for example, a magnetic tape and a hard disk; and a communication device 909. The communication device 909 may allow the electronic device 900 to perform wireless or wired communication with other devices to exchange data. Although FIG. 9 shows the electronic device 900 having various devices, it should be understood that it is not required to implement or have all the shown devices. It may be an alternative to implement or have more or fewer devices.

In particular, according to an embodiment of the present disclosure, the foregoing processes described with reference to the flowcharts may be implemented as a computer software program. For example, an embodiment of the present disclosure includes a computer program product, which includes a computer program carried on a non-transitory computer-readable medium, where the computer program includes program codes for performing the method shown in the flowchart. In such an embodiment, the computer program may be downloaded and installed from a network through the communication device 909, or installed from the storage device 908, or installed from the ROM 902. When the computer program is executed by the processing device 901, the above functions defined in the method of the embodiment of the present disclosure are performed.

The electronic device provided in this embodiment of the present disclosure and the method provided in the above embodiment belong to the same inventive concept. For technical details not described in detail in this embodiment, reference may be made to the above embodiment, and this embodiment and the above embodiment have the same beneficial effects.

An embodiment of the present disclosure further provides a computer-readable medium having stored therein an instruction or a computer program, where when the instruction or the computer program runs on a device, the device is enabled to execute any implementation of the lakehouse metadata tag creation method or any implementation of the lakehouse metadata tag query method provided in the embodiments of the present disclosure.

It should be noted that the foregoing computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, the client and the server can communicate by using any currently known or future-developed network protocol such as hypertext transfer protocol (HTTP), and can be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the foregoing electronic device. Alternatively, the computer-readable medium may exist independently, without being assembled into the electronic device.

The computer-readable medium carries one or more programs, and when the one or more programs are executed by the electronic device, the electronic device can execute the foregoing method.

The computer program code for performing the operations of the present disclosure can be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

A unit involved in the embodiments described in the present disclosure may be implemented by means of software, and may also be implemented by means of hardware. The name of a unit/module does not constitute a limitation on the unit in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random-access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

It should be noted that various embodiments in this specification are described in a progressive manner, and each embodiment focuses on differences from other embodiments. For the same or similar parts between the embodiments, reference may be made to each other. For the system or apparatus disclosed in the embodiments, since it corresponds to the method disclosed in the embodiments, the description is relatively simple, and for the related parts, reference may be made to the description of the method section.

It should be understood that in the present disclosure, "at least one item" means one or more items, and "a plurality of items" means two or more items. "And/or" describes an association relationship between associated objects, and represents that three relationships may exist. For example, "A and/or B" may represent: only A exists, only B exists, and both A and B exist, where A and B may be singular or plural. The character "/" generally indicates that the associated objects before and after "/" are in an "or" relationship. "At least one of the following items (pieces)" or a similar expression thereof indicates any combination of these items, including a single item (piece) or any combination of a plurality of items (pieces). For example, at least one of a, b, or c may represent: a, b, c, "a and b", "a and c", "b and c", or "a, b, and c", where a, b, and c may be singular or plural.

It should be further noted that in the present disclosure, relational terms such as first and second are only used to distinguish one entity or operation from another entity or operation, and do not necessarily require or imply any such actual relationship or order between these entities or operations. Moreover, the term "comprise", "include" or any other variant thereof is intended to cover non-exclusive inclusion, so that a process, method, article or device including a series of elements includes not only those elements, but also other elements not explicitly listed, or elements inherent to such a process, method, article or device. Without more restrictions, an element defined by the statement "include/including a . . . " does not exclude the existence of additional identical elements in the process, method, article, or device including the element.

The steps of the method or algorithm described in connection with the embodiments disclosed herein may be implemented directly in hardware, in a software module executed by a processor, or in a combination thereof. The software module may be placed in random-access memory (RAM), memory, read-only memory (ROM), electrically programmable ROM, electrically erasable programmable ROM, registers, hard disks, removable disks, CD-ROMs, or any other form of storage medium known in the art.

The foregoing descriptions of the disclosed embodiments enable those skilled in the art to implement or use the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be in accordance with the widest scope consistent with the principles and novel features disclosed herein.

The invention claimed is:

1. A lakehouse metadata tag creation method, applied to a metadata tag service system, the method comprising:
   receiving a metadata tag creation request sent by a metadata service gateway, wherein the metadata tag creation request is determined by the metadata service gateway based on a metadata tag creation parameter provided by a data engine, the metadata tag creation parameter comprises a first tag name, a first tag value, and first tag object description information, and the data engine uses a lakehouse metadata management system by means of interface calling; and
   executing a tag creation logic based on the metadata tag creation parameter carried in the metadata tag creation request, wherein the tag creation logic comprises:
     writing tag name record content corresponding to the first tag name into a tag name record table, wherein the tag name record content comprises a tag name identifier corresponding to the first tag name;
     writing tag object record content corresponding to the first tag object description information into a tag object record table, wherein the tag object record content comprises a tag object identifier corresponding to the first tag object description information; and
     writing tag value record content corresponding to the first tag value into a tag value record table, wherein the tag value record content is determined based on the first tag value, the tag name identifier, and the tag object identifier.

2. The method according to claim 1, wherein the metadata tag creation parameter further comprises a first tag set name; and
   before the writing tag name record content corresponding to the first tag name into a tag name record table, the tag creation logic further comprises:
   writing tag set record content corresponding to the first tag set name into a tag set record table, wherein the tag set record content comprises a set identifier corresponding to the first tag set name; and
   determining the tag name record content corresponding to the first tag name based on the set identifier and the first tag name.

3. The method according to claim 1, wherein the writing tag object record content corresponding to the first tag object description information into a tag object record table comprises:
   in response to a non-existence of tag object record content corresponding to the first tag object description information in the tag object record table, writing the tag object record content corresponding to the first tag object description information into the tag object record table.

4. The method according to claim 1, further comprising:
   in response to detecting that the tag creation logic has been executed, generating feedback information corresponding to the metadata tag creation request; and
   sending the feedback information to the metadata service gateway, wherein the metadata service gateway is configured to forward the feedback information to the data engine.

5. The method according to claim 4, wherein
   the generating feedback information corresponding to the metadata tag creation request comprises:
   combining the first tag value, a set identifier corresponding to the first tag set name, the tag name identifier corresponding to the first tag name, and the tag object identifier corresponding to the first tag object description information to obtain the feedback information.

6. The method according to claim 1, wherein the metadata tag creation request is a request for creating a tag corresponding to one piece of metadata or a plurality of pieces of metadata;
   the one piece of metadata or the plurality of pieces of metadata are managed by a metadata storage system; and
   the metadata service gateway is configured to route a metadata processing request sent by the data engine to the metadata storage system, and the metadata storage system is configured to execute data processing logic corresponding to the metadata processing request.

7. A lakehouse metadata tag query method, applied to a metadata tag service system, wherein the metadata tag service system is configured to query a tag created by using the lakehouse metadata tag creation method according to claim 1; and
   the query method comprises:
   receiving a metadata tag query request sent by a metadata service gateway, wherein the metadata tag query request is determined by the metadata service gateway based on a metadata tag query parameter provided by a data engine;
   performing tag query processing based on the metadata tag query parameter carried in the metadata tag query request, to obtain a tag query result corresponding to the metadata tag query request; and
   sending the tag query result to the metadata service gateway, wherein the metadata service gateway is configured to feed back the tag query result to the data engine.

8. The method according to claim 7, wherein the metadata tag query parameter comprises a second tag name and second tag object description information; and
   a process of determining the tag query result comprises:
     searching for a tag name identifier corresponding to the second tag name in a tag name record table;
     searching for a tag object identifier corresponding to the second tag object description information in the tag object record table;
     querying the tag value record table based on the tag name identifier and the tag object identifier, to obtain a second tag value; and
     determining the tag query result based on the second tag value.

9. The method according to claim 8, wherein the metadata tag creation parameter further comprises a second tag set name; and
   before the searching for a tag name identifier corresponding to the second tag name in a tag name record table, the process of determining the tag query result further comprises:
   searching for a set identifier corresponding to the second tag set name in a tag set record table; and the searching for a tag name identifier corresponding to the second tag name in a tag name record table comprises:
  querying the tag name record table based on the set identifier and the second tag name, to obtain the tag name identifier corresponding to the second tag name.

10. The method according to claim 9, wherein the determining the tag query result based on the second tag value comprises:
  combining the set identifier, the tag name identifier, the tag object identifier, and the second tag value to obtain the tag query result.

11. An electronic device, comprising:
  at least one processor and a memory, the memory being configured to store an instruction or a computer program, and the at least one processor being configured to execute the instruction or the computer program in the memory, so that the electronic device executes a lakehouse metadata tag creation method, comprising:
    receiving a metadata tag creation request sent by a metadata service gateway, wherein the metadata tag creation request is determined by the metadata service gateway based on a metadata tag creation parameter provided by a data engine, the metadata tag creation parameter comprises a first tag name, a first tag value, and first tag object description information, and the data engine uses a lakehouse metadata management system by means of interface calling; and
    executing a tag creation logic based on the metadata tag creation parameter carried in the metadata tag creation request, wherein the tag creation logic comprises:
      writing tag name record content corresponding to the first tag name into a tag name record table, wherein the tag name record content comprises a tag name identifier corresponding to the first tag name;
      writing tag object record content corresponding to the first tag object description information into a tag object record table, wherein the tag object record content comprises a tag object identifier corresponding to the first tag object description information; and
      writing tag value record content corresponding to the first tag value into a tag value record table, wherein the tag value record content is determined based on the first tag value, the tag name identifier, and the tag object identifier.

12. The electronic device according to claim 11, wherein in the lakehouse metadata tag creation method,
  the metadata tag creation parameter further comprises a first tag set name; and
  before the writing tag name record content corresponding to the first tag name into a tag name record table, the tag creation logic further comprises:
    writing tag set record content corresponding to the first tag set name into a tag set record table, wherein the tag set record content comprises a set identifier corresponding to the first tag set name; and
    determining the tag name record content corresponding to the first tag name based on the set identifier and the first tag name.

13. The electronic device according to claim 11, wherein in the lakehouse metadata tag creation method,
  the writing tag object record content corresponding to the first tag object description information into a tag object record table comprises:
    in response to a non-existence of tag object record content corresponding to the first tag object description information in the tag object record table, writing the tag object record content corresponding to the first tag object description information into the tag object record table.

14. The electronic device according to claim 11, wherein the lakehouse metadata tag creation method further comprises:
  in response to detecting that the tag creation logic has been executed, generating feedback information corresponding to the metadata tag creation request; and
  sending the feedback information to the metadata service gateway, wherein the metadata service gateway is configured to forward the feedback information to the data engine.

15. The electronic device according to claim 14, wherein in the lakehouse metadata tag creation method,
  the generating feedback information corresponding to the metadata tag creation request comprises:
    combining the first tag value, a set identifier corresponding to the first tag set name, a tag name identifier corresponding to the first tag name, and the tag object identifier corresponding to the first tag object description information to obtain the feedback information.

16. The electronic device according to claim 11, wherein in the lakehouse metadata tag creation method,
  the metadata tag creation request is a request for creating a tag corresponding to one piece of metadata or a plurality of pieces of metadata;
  the one piece of metadata or the plurality of pieces of metadata are managed by a metadata storage system; and
  the metadata service gateway is configured to route a metadata processing request sent by the data engine to the metadata storage system, and the metadata storage system is configured to execute data processing logic corresponding to the metadata processing request.

17. The electronic device according to claim 11, wherein the at least one processer is further configured to execute the instruction or the computer program in the memory, so that the electronic device executes a query method for a tag created by using the lakehouse metadata tag creation method,
  the query method comprises:
    receiving a metadata tag query request sent by the metadata service gateway, wherein the metadata tag query request is determined by the metadata service gateway based on a metadata tag query parameter provided by the data engine;
    performing tag query processing based on the metadata tag query parameter carried in the metadata tag query request, to obtain a tag query result corresponding to the metadata tag query request; and
    sending the tag query result to the metadata service gateway, wherein the metadata service gateway is configured to feed back the tag query result to the data engine.

18. The electronic device according to claim 17, wherein in the query method, the metadata tag query parameter comprises a second tag name and second tag object description information; and a process of determining the tag query result comprises:
  searching for a tag name identifier corresponding to the second tag name in the tag name record table;
  searching for a tag object identifier corresponding to the second tag object description information in the tag object record table;
  querying the tag value record table based on the tag name identifier and the tag object identifier, to obtain a second tag value; and
  determining the tag query result based on the second tag value.

19. The electronic device according to claim 18, wherein the metadata tag creation parameter further comprises a second tag set name; and
  before the searching for a tag name identifier corresponding to the second tag name in the tag name record table, the process of determining the tag query result further comprises:
  searching for a set identifier corresponding to the second tag set name in a tag set record table; and
  the searching for the tag name identifier corresponding to the second tag name in a tag name record table comprises:
  querying the tag name record table based on the set identifier and the second tag name, to obtain the tag name identifier corresponding to the second tag name.

20. The electronic device according to claim 19, wherein the determining the tag query result based on the second tag value comprises:
  combining the set identifier, the tag name identifier, the tag object identifier, and the second tag value to obtain the tag query result.

* * * * *